US008404077B2

(12) United States Patent
Burckhardt

(10) Patent No.: US 8,404,077 B2
(45) Date of Patent: Mar. 26, 2013

(54) POLYURETHANE COMPOSITION THAT CONTAINS ORGANOMETHOXYSILANE AND HAS ANISOTROPIC MATERIAL PROPERTIES

(75) Inventor: Urs Burckhardt, Zurich (CH)

(73) Assignee: Sika Technology AG, Baar (CH)

( * ) Notice: Subject to any disclaimer, the term of this patent is extended or adjusted under 35 U.S.C. 154(b) by 0 days.

(21) Appl. No.: 13/095,463

(22) Filed: Apr. 27, 2011

(65) Prior Publication Data

US 2011/0198031 A1 Aug. 18, 2011

Related U.S. Application Data

(63) Continuation of application No. PCT/EP2009/064351, filed on Oct. 30, 2009.

(30) Foreign Application Priority Data

Oct. 31, 2008 (EP) .................................. 08168090

(51) Int. Cl.
| | |
|---|---|
| *C09J 4/00* | (2006.01) |
| *C09J 101/00* | (2006.01) |
| *C09J 201/00* | (2006.01) |
| *C04B 37/00* | (2006.01) |
| *C08F 283/04* | (2006.01) |

(52) U.S. Cl. ....................... 156/325; 156/331.7; 525/454
(58) Field of Classification Search .................. 156/325, 156/331.7; 525/454
See application file for complete search history.

(56) References Cited

U.S. PATENT DOCUMENTS

| | | | |
|---|---|---|---|
| 2004/0224096 A1* | 11/2004 | Yamanaka | 427/407.1 |
| 2008/0114146 A1* | 5/2008 | Burckhardt | 528/67 |
| 2008/0138522 A1* | 6/2008 | Burckhardt | 427/302 |
| 2008/0251204 A1 | 10/2008 | Burckhardt et al. | |
| 2009/0159204 A1 | 6/2009 | Burckhardt et al. | |
| 2009/0202837 A1 | 8/2009 | Onuoha et al. | |
| 2011/0198030 A1 | 8/2011 | Burckhardt | |

FOREIGN PATENT DOCUMENTS

| | | |
|---|---|---|
| WO | WO 2006/130592 A1 | 12/2006 |
| WO | WO 2007/036574 A1 | 4/2007 |
| WO | WO 2007/104761 A1 | 9/2007 |
| WO | WO 2008/107475 A1 | 9/2008 |
| WO | WO 2008/116900 A1 | 10/2008 |
| WO | WO 2008/116902 A1 | 10/2008 |

OTHER PUBLICATIONS

Notification of Transmittal of Translation of the International Preliminary Report on Patentability (Forms PCT/IB/338 and PCT/IB/373) and the Written Opinion of the Searching Authority ( Form PCT/ISA/237) issued on May 12, 2011, in the corresponding International Application No. PCT/EP2009/064351.
Notification of Transmittal of Translation of the International Preliminary Report on Patentability (Forms PCT/IB/338 and PCT/IB/373) and the Written Opinion of the Searching Authority ( Form PCT/ISA/237) issued on May 12, 2011, in the corresponding International Application No. PCT/EP2009/064358.
International Search Report (PCT/ISA/210) issued on Jan. 29, 2010, by European Patent Office as the International Searching Authority for International Application No. PCT/EP2009/064351.
Written Opinion (PCT/ISA/237) issued on Jan. 29, 2010, by European Patent Office as the International Searching Authority for International Application No. PCT/EP2009/064351.
International Search Report (PCT/ISA/210) issued on Jan. 29, 2010, by European Patent Office as the International Searching Authority for International Application No. PCT/EP2009/064358.
Written Opinion (PCT/ISA/237) issued on Jan. 29, 2010, by European Patent Office as the International Searching Authority for International Application No. PCT/EP2009/064358.
U.S. Appl. No. 13/095,289, filed on Apr. 27, 2011, entitled "Polyurethane Composition That Contains Alpha-Silane and That Has Anisotropic Material Properties", naming Urs Burckhardt as the inventor (corresponds to US-2011/0198030 A1).

* cited by examiner

*Primary Examiner* — Michael Orlando
(74) *Attorney, Agent, or Firm* — Buchanan Ingersoll & Rooney PC

(57) ABSTRACT

A single-component, moisture-curing composition, including at least one polyisocyanate, a polyaldimine, an organomethoxysilane, an acid as well as a tin catalyst in special proportions that can be matched to one another. An exemplary composition cures by moisture as much as possible without forming bubbles. In the curing of the composition by atmospheric humidity, an anisotropic material is produced with a predominantly elastic sheath that is virtually tack-free on the surface and a predominantly plastic core. An exemplary composition can be especially well suited as a flexible sealant.

23 Claims, No Drawings

POLYURETHANE COMPOSITION THAT CONTAINS ORGANOMETHOXYSILANE AND HAS ANISOTROPIC MATERIAL PROPERTIES

RELATED APPLICATIONS

This application claims priority as a continuation application under 35 U.S.C. §120 to PCT/EP2009/064351, which was filed as an International Application on Oct. 30, 2009 designating the U.S., and which claims priority to European Application No. 08168090.2 filed in Europe on Oct. 31, 2008. The entire contents of these applications are hereby incorporated by reference in their entireties.

FIELD

This disclosure relates to the field of single-component, moisture-curing polyurethane compositions as well as their applications, such as sealants.

BACKGROUND INFORMATION

Single-component, moisture-curing polyurethane compositions have been used for a long time as adhesives, sealants, and coatings. For the application as sealants for expansion joints on structures, compositions can be required or desirable that cure without forming bubbles and are flexible after their curing in a broad temperature range; i.e., in the low expansion range, they have the lowest possible values for the tensile stress and at the same time have a high shape recovery. As a result, such sealants are able to supplement expansion or compression of the joints that is induced by movements or temperature differences in a reversible manner and with low power transmission on the joint substrates and thus to stress or to damage the latter as little as possible.

Single-component polyurethane compositions that contain long-chain polyaldimines and that are suitable as flexible sealants are known from WO 2007/104761 A1. The compositions that are described cure without forming bubbles and have low values for 100% tensile stress both at room temperature and at −20° C. Like other flexible polyurethane compositions, they also tend to form a more or less strongly adhesive surface, which easily becomes dirty, during curing, however. Expansion joints in the outside area of structures are in most cases readily visible to the observer and are matched in color to the front of the building. They often have, moreover, a bright color tone, such as white, light gray, or concrete gray; their soiling is thus often quickly visible and therefore distracting.

Single-component polyurethane compositions that contain special polyaldimines, which are suitable as sealants that do not tend to get dirty, are known from WO 2008/116900 A1 and WO 2008/116902 A1. The compositions that are described have a low surface adhesiveness after curing but do not show any anisotropic material properties.

SUMMARY

A single-component, moisture-curing composition is disclosed, comprising:
a) at least one polyisocyanate P;
b) at least one aldimine A of Formula (I),

(I)

wherein
n stands for 2 or 3 or 4,
E stands for an organic radical of an n-value amine B after removal of n primary amino groups, and
Y stands for a monovalent hydrocarbon radical with 1 to 35 C atoms, which optionally contains at least one heteroatom,
c) at least one organomethoxysilane OS, which has at least one grouping of Formula (VI),

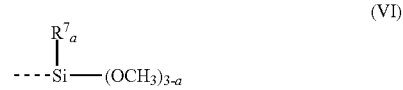

(VI)

wherein
a stands for 0 or 1 or 2, and
$R^7$ stands for an alkyl radical with 1 to 8 C atoms,
d) at least one tin catalyst Z in the form of a dialkyltin(IV) compound,
e) at least one acid S;
provided that in the composition,
(i) a ratio V1 between a number of aldimino groups and a number of isocyanate groups is in a range of 0.2 to 0.8,
(ii) a ratio V2 between a number of methoxy groups of the organomethoxysilane OS and a number of isocyanate groups is in a range of 0.2 to 0.7, and
(iii) a ratio V3 between a number of tin atoms from the tin catalyst Z and a number of isocyanate groups is in a range of 0.002 to 0.006.

A method for bonding a substrate S1 to a substrate S2 is disclosed, comprising:
α) applying a single-component, moisture-curing composition on a substrate S1; and
β) bonding of the applied composition to a substrate S2 within an open time of the composition;
or
α') applying a single-component, moisture-curing composition on a substrate S1 and on a substrate S2; and
β') bonding of the applied composition on the substrate S1 and on the substrate S2 to one another within an open time of the composition;
wherein the substrate S2 is formed of the same or a different material as the substrate S1,
wherein the single-component, moisture-curing composition comprises:
a) at least one polyisocyanate P;
b) at least one aldimine A of Formula (I),

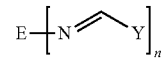

(I)

wherein
n stands for 2 or 3 or 4,
E stands for an organic radical of an n-value amine B after removal of n primary amino groups, and
Y stands for a monovalent hydrocarbon radical with 1 to 35 C atoms, which optionally contains at least one heteroatom,
c) at least one organomethoxysilane OS, which has at least one grouping of Formula (VI),

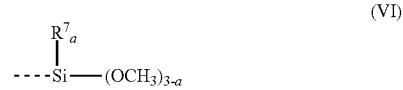

(VI)

wherein a stands for 0 or 1 or 2, and $R^7$ stands for an alkyl radical with 1 to 8 C atoms, d) at least one tin catalyst Z in the form of a dialkyltin(IV) compound, e) at least one acid S;

provided that in the composition, (i) a ratio V1 between a number of aldimino groups and a number of isocyanate groups is in a range of 0.2 to 0.8, (ii) a ratio V2 between a number of methoxy groups of the organomethoxysilane OS and a number of isocyanate groups is in a range of 0.2 to 0.7, and (iii) a ratio V3 between a number of tin atoms from the tin catalyst Z and a number of isocyanate groups is in a range of 0.002 to 0.006.

A method for sealing is disclosed, comprising:

α″) applying a single-component, moisture-curing composition between a substrate S1 and a substrate S2, such that the composition is in contact with the substrate S1 and the substrate S2;

wherein the substrate S2 is formed of the same or a different material as the substrate S1, wherein the single-component, moisture-curing composition comprises:

a) at least one polyisocyanate P;

b) at least one aldimine A of Formula (I),

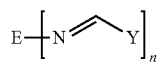

(I)

wherein n stands for 2 or 3 or 4,

E stands for an organic radical of an n-value amine B after removal of n primary amino groups, and Y stands for a monovalent hydrocarbon radical with 1 to 35 C atoms, which optionally contains at least one heteroatom, c) at least one organomethoxysilane OS, which has at least one grouping of Formula (VI),

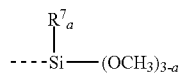

(VI)

wherein a stands for 0 or 1 or 2, and $R^7$ stands for an alkyl radical with 1 to 8 C atoms, d) at least one tin catalyst Z in the form of a dialkyltin(IV) compound, e) at least one acid S;

provided that in the composition, (i) a ratio V1 between a number of aldimino groups and a number of isocyanate groups is in a range of 0.2 to 0.8, (ii) a ratio V2 between a number of methoxy groups of the organomethoxysilane OS and a number of isocyanate groups is in a range of 0.2 to 0.7, and (iii) a ratio V3 between a number of tin atoms from the tin catalyst Z and a number of isocyanate groups is in a range of 0.002 to 0.006.

An anisotropic composition is disclosed with a predominantly elastic sheath and a predominantly plastic core, produced by curing a single-component, moisture-curing composition by means of atmospheric humidity.

An isotropic composition is disclosed that is produced by curing a single-component, moisture-curing composition by essentially homogeneously mixed-in water or by means of a component that contains essentially homogeneously mixed-in water.

DETAILED DESCRIPTION

Single-component, moisture-curing polyurethane compositions are disclosed that can cure, for example, without forming bubbles, and after curing, they can have a largely tack-free surface, as well as low values for 100% tensile stress and good shape recovery.

An exemplary composition can cure by means of moisture and largely without forming bubbles. In the curing of the composition by means of atmospheric humidity, an anisotropic material can be produced with a predominantly elastic sheath ("top") that is virtually tack-free on the surface and a predominantly plastic core. In the curing of the composition by means of a sufficiently large amount of essentially homogeneously mixed-in water, however, a largely isotropic material can be produced. The composition can vary within a broad range relative to its mechanical properties. It is suitable, for example, as a flexible sealant for building and industry applications, for example, for expansion joints on structures or seals in automobiles. It can also be used, for example, as a vibration-suppressing adhesive or sealant or as a shock- and/or vibration-suppressing coating. In its application as a sealant for joints and after curing by means of atmospheric humidity, a joint can be produced with a tack-free, resistant surface, which as a whole can have pronounced flexible properties in a broad temperature range and good shape recovery and is less susceptible to soiling.

In an exemplary embodiment, a single-component, moisture-curing composition is disclosed that comprises a) at least one polyisocyanate P, b) at least one aldimine A of Formula (I),

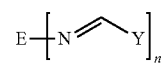

(I)

whereby n stands for 2 or 3 or 4,

E stands for the organic radical of an n-value amine B after removal of n primary amino groups, and Y stands for a monovalent hydrocarbon radical with 1 to 35 C atoms, which optionally contains at least one heteroatom, c) at least one organomethoxysilane OS, which has at least one grouping of Formula (VI),

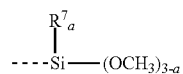

(VI)

whereby a stands for 0 or 1 or 2, for example, for 0 or 1, and $R^7$ stands for an alkyl radical with 1 to 8 C atoms, for example, for a methyl radical, d) at least one tin catalyst Z in the form of a dialkyltin(IV) compound,
e) at least one acid S;
provided that in the composition,
(i) the ratio V1 between the number of aldimino groups and the number of isocyanate groups is in the range of 0.2 to 0.8, and that
(ii) the ratio V2 between the number of methoxy groups of the organomethoxysilane OS and the number of isocyanate groups is in the range of 0.2 to 0.7, and that
(iii) the ratio V3 between the number of tin atoms from the tin catalyst Z and the number of isocyanate groups is in the range of 0.002 to 0.006.

In this document, substance names that begin with "poly," such as polyol, polyisocyanate or polyaldehyde, include substances that formally contain two or more functional groups, occurring in its name, per molecule.

In this document, the term "polyisocyanate" comprises compounds with two or more isocyanate groups, regardless of whether these are monomeric diisocyanates, oligomeric polyisocyanates or polymers with a relatively high molecular weight that have isocyanate groups.

In this document, the term "organomethoxysilane" includes a silicon-containing compound in which the silicon atom carries both at least one, for example, two or three, methoxy groups and at least one directly bonded organic radical and thus has at least one Si—C bond. The term "silane group" includes the silicon-containing group that is bonded to the organic radical of the organomethoxysilane. Organomethoxysilanes, or their silane groups, can have the property of hydrolyzing upon contact with moisture and in this case releasing methanol.

The term "tensile stress" refers to the stress that acts in a material in the expanded state. The term "100% tensile stress" refers to the stress that acts in a material that is stretched to twice its length.

In an exemplary embodiment, a polyurethane polymer PUP that has isocyanate groups is suitable as a polyisocyanate P.

The term "polyurethane polymer" comprises all polymers that are produced according to the so-called diisocyanate-polymer method. This also includes those polymers that are almost free or completely free of urethane groups. Examples of polyurethane polymers are polyether polyurethanes, polyester polyurethanes, polyether polyureas, polyureas, polyester polyureas, polyisocyanurates and polycarbodiimides.

A suitable polyurethane polymer PUP can be obtained, for example, from the reaction of at least one polyol with at least one polyisocyanate. This reaction can be carried out in that the polyol and the polyisocyanate are reacted with commonly used methods, for example at temperatures of 50° C. to 100° C., optionally with simultaneous use of suitable catalysts, whereby the polyisocyanate can be metered in such a way that its isocyanate groups are present in stoichiometric excess relative to the hydroxyl groups of the polyol. The polyisocyanate can be advantageously metered in such a way that an NCO/OH ratio of 1.3 to 5, for example, 1.5 to 3, is maintained. The "NCO/OH ratio" means the ratio of the number of isocyanate groups used to the number of hydroxyl groups used. For example, a content of free isocyanate groups of 0.5 to 15% by weight, for example, 0.5 to 5% by weight, can remain in the polyurethane polymer PUP after the reaction of all hydroxyl groups of the polyol.

Optionally, the polyurethane polymer PUP can be produced with simultaneous use of softeners, whereby the softeners that are used do not contain any groups that are reactive relative to isocyanates.

As polyols for the production of a polyurethane polymer PUP, for example, the following commercially available polyols or mixtures thereof can be used:

Polyoxyalkylene polyols, also called polyether polyols or oligoetherols, which are polymerization products of ethylene oxide, 1,2-propylene oxide, 1,2- or 2,3-butylene oxide, oxetane, tetrahydrofuran or mixtures thereof, optionally polymerized using a starter molecule with two or more active hydrogen atoms such as, for example, water, ammonia or compounds with several OH or NH groups, such as, for example, 1,2-ethanediol, 1,2- and 1,3-propanediol, neopentylglycol, diethylene glycol, triethylene glycol, the isomeric dipropylene glycols and tripropylene glycols, the isomeric butanediols, pentanediols, hexanediols, heptanediols, octanediols, nonanediols, decanediols, undecanediols, 1,3- and 1,4-cyclohexanedimethanol, bisphenol A, hydrogenated bisphenol A, 1,1,1-trimethylolethane, 1,1,1-trimethylolpropane, glycerol, aniline, as well as mixtures of the above-mentioned compounds. Both polyoxyalkylene polyols—which have a low degree of unsaturation (measured according to ASTM D-2849-69 and indicated in milliequivalents of unsaturation per gram of polyol (mEq/g)) and are produced, for example, using so-called double-metal cyanide complex catalysts (DMC catalysts)—as well as polyoxyalkylene polyols—which have a higher degree of unsaturation and are produced, for example, using anionic catalysts, such as NaOH, KOH, CsOH or alkali alcoholates—can be used.

Polyoxyalkylene diols or polyoxyalkylene triols, for example, polyoxyethylene and polyoxypropylene diols and triols, can be used.

Polyoxyalkylene diols and triols with a degree of unsaturation that is less than 0.02 mEq/g and with a molecular weight in the range of 1,000-30,000 g/mol, as well as polyoxypropylene diols and triols with a molecular weight of 400-8,000 g/mol are especially suitable.

So-called ethylene oxide-terminated ("EO-endcapped," ethylene oxide-endcapped) polyoxypropylene polyols can be used. The latter are special polyoxypropylene polyoxyethylene polyols, which can be obtained, for example, in that pure polyoxypropylene polyols, for example, polyoxypropylene diols and -triols, after the polypropoxylation reaction with ethylene oxide is concluded, are further alkoxylated and as a result have primary hydroxyl groups.

Styrene-acrylonitrile or acrylonitrile-methylmethacrylate-plugged polyether polyols.

Polyester polyols, also called oligoesterols, produced according to known methods, for example, the polycondensation of hydroxycarboxylic acids or the polycondensation of aliphatic and/or aromatic polycarboxylic acids with divalent or multivalent alcohols.

In an exemplary embodiment, polyester polyols can be used that are produced from divalent to trivalent, for example, divalent, alcohols, such as, for example, ethylene glycol, diethylene glycol, propylene glycol, dipropylene glycol, neopentyl glycol, 1,4-butanediol, 1,5-pentanediol, 3-methyl-1,5-hexanediol, 1,6-hexanediol, 1,8-octanediol, 1,10-decanediol, 1,12-dodecanediol, 1,12-hydroxystearyl alcohol, 1,4-cyclohexanedimethanol, dimer fatty acid diol (dimer diol), hydroxypivalic acid neopentyl glycol ester, glycerol, 1,1,1-trimethylolpropane or mixtures of the above-mentioned alcohols, with organic di- or tricarboxylic acids, for example, dicarboxylic acids, or their anhydrides or esters, such as, for example, succinic acid, glutaric acid, adipic acid, trimethyladipic acid, suberic acid, azelaic acid, sebacic acid, dodecanedicarboxylic acid, maleic acid, fumaric acid, dimer fatty acid, phthalic acid, phthalic acid anhydride, isophthalic acid, terephthalic acid, dimethyl terephthalate, hexahydrophthalic acid, trimellitic acid and trimellitic acid anhydride or mixtures of the above-mentioned acids, as well as polyester polyols that include lactones, such as, for example, ε-caprolactone and starters such as the above-mentioned divalent or trivalent alcohols.

In an exemplary embodiment, suitable for use as polyester polyols are polyester diols.

Polycarbonate polyols, as they are available by reaction of, for example, the above-mentioned alcohols—used for the creation of polyester polyols—with dialkylcarbonates, diaryl carbonates or phosgene.

At least two hydroxyl-group-carrying block copolymers that have at least two different blocks with polyether, polyester and/or polycarbonate structures of the above-described type, for example, polyether-polyester polyols.

Polyacrylate- and polymethacrylate polyols.

Polyhydroxy-functional fats and oils, for example natural fats and oils, for example, castor oil; or polyols—so-called oleochemical polyols—obtained by chemical modification of natural fats and oils, for example the epoxy polyesters or epoxy polyethers obtained by epoxidation of unsaturated oils and subsequent ring opening with carboxylic acids or alcohols, or polyols obtained by hydroformylation and hydrogenation of unsaturated oils; or polyols obtained from natural fats and oils by degradation processes such as alcoholysis or ozonolysis and subsequent chemical cross-linking, for example by re-esterification or dimerization, of the thus obtained degradation products or derivatives thereof. Suitable degradation products of natural fats and oils are for example, fatty acids and fatty alcohols as well as fatty acid esters, for example, the methyl ester (FAME) that can be derivatized, for example, by hydroformylation and hydrogenation to form hydroxy fatty acid esters.

Polyhydrocarbon polyols, also called oligohydrocarbonols, such as, for example, polyhydroxy-functional polyolefins, polyisobutylenes, polyisoprenes; polyhydroxy-functional ethylene-propylene-, ethylene-butylene- or ethylene-propylene-diene copolymers, as they are produced by, for example, the company Kraton Polymers; polyhydroxy-functional polymers of dienes, for example, of 1,3-butadiene, which can be produced, for example, also from anionic polymerization; polyhydroxy-functional copolymers that include dienes, such as 1,3-butadiene or diene mixtures and vinyl monomers such as styrene, acrylonitrile, vinyl chloride, vinyl acetate, vinyl alcohol, isobutylene and isoprene, for example polyhydroxy-functional acrylonitrile/butadiene copolymers, as they can be produced from, for example, epoxides or amino alcohols and carboxyl-terminated acrylonitrile/butadiene copolymers (for example commercially available under the names Hypro® (previously Hycar®) CTBN and CTBNX and ETBN of Nanoresins AG, Germany, or Emerald Performance Materials LLC); as well as hydrogenated polyhydroxy-functional polymers or copolymers of dienes.

These above-mentioned polyols can have a mean molecular weight of 250-30,000 g/mol, for example, 400-20,000 g/mol, and they can have a mean OH-functionality in the range of 1.6 to 3.

As polyols, polyether-, polyester-, polycarbonate- and polyacrylate polyols, for example, diols and triols, can be used. Polyether polyols, for example, polyoxypropylene- and polyoxypropylene-polyoxyethylene polyols, as well as liquid polyester polyols and polyether-polyester polyols, can be used.

In addition to these above-mentioned polyols, small amounts of low-molecular, divalent or multivalent alcohols, such as, for example, 1,2-ethanediol, 1,2- and 1,3-propanediol, neopentyl glycol, diethylene glycol, triethylene glycol, the isomeric dipropylene glycols and tripropylene glycols, the isomeric butanediols, pentanediols, hexanediols, heptanediols, octanediols, nonanediols, decanediols, undecanediols, 1,3- and 1,4-cyclohexanedimethanol, hydrogenated bisphenol A, dimeric fatty alcohols, 1,1,1-trimethylolethane, 1,1,1-trimethylolpropane, glycerol, pentaerythritol, sugar alcohols, such as xylitol, sorbitol, or mannitol, sugars such as saccharose, other polyhydric alcohols, low-molecular alkoxylating products of the above-mentioned divalent and multivalent alcohols, as well as mixtures of the above-mentioned alcohols can be used simultaneously in the production of the polyurethane polymer PUP. Also, small amounts of polyols with a mean OH functionality of more than 3, for example sugar polyols, can be used simultaneously.

Aromatic or aliphatic polyisocyanates, for example, aromatic or aliphatic diisocyanates, are used as polyisocyanates for the production of a polyurethane polymer PUP that has isocyanate groups.

An "aromatic isocyanate" includes an organic compound, which has exclusively aromatic isocyanate groups. An "aromatic" includes an isocyanate group that is bonded to an aromatic or heteroaromatic radical. An "aliphatic isocyanate" includes an organic compound that contains aliphatic isocyanate groups. An isocyanate group referred to as "aliphatic" includes an isocyanate group that is bonded to an aliphatic, cycloaliphatic or arylaliphatic radical.

As aromatic polyisocyanates, for example, the following are suitable: monomeric di- or triisocyanates, such as 2,4- and 2,6-toluoylene diisocyanate and any mixtures of these isomers (TDI), 4,4'-, 2,4'- and 2,2'-diphenylmethane diisocyanate and any mixtures of these isomers (MDI), mixtures that include MDI and MDI homologs (polymeric MDI or PMDI), 1,3- and 1,4-phenylene diisocyanate, 2,3,5,6-tetramethyl-1,4-diisocyanatobenzene, naphthalene-1,5-diisocyanate (NDI), 3,3'-dimethyl-4,4'-diisocyanatodiphenyl (TODI), dianisidine diisocyanate (DADI), 1,3,5-tris-(isocyanatomethyl)-benzene, tris-(4-isocyanatophenyl)-methane, tris-(4-isocyanatophenyl)-thiophosphate, oligomers and polymers of the above-mentioned isocyanates, as well as any mixtures of the above-mentioned isocyanates. MDI and TDI can be used.

As aliphatic polyisocyanates, for example, the following are suitable: monomeric di- or triisocyanates such as 1,4-tetramethylene diisocyanate, 2-methylpentamethylene-1,5-diisocyanate, 1,6-hexamethylene diisocyanate (HDI), 2,2,4- and 2,4,4-trimethyl-1,6-hexamethylene diisocyanate (TMDI), 1,10-decamethylene diisocyanate, 1,12-dodecamethylene diisocyanate, lysine and lysine ester diisocyanate, cyclohexane-1,3- and -1,4-diisocyanate, 1-methyl-2,4- and -2,6-diisocyanato-cyclohexane, and any mixtures of these isomers (HTDI or H$_6$TDI), 1-isocyanato-3,3,5-trimethyl-5-isocyanatomethyl-cyclohexane (=isophorone diisocyanate or IPDI), perhydro-2,4'- and -4,4'-diphenylmethane diisocyanate (HMDI or H$_{12}$MDI), 1,4-diisocyanato-2,2,6-trimethylcyclohexane (TMCDI), 1,3- and 1,4-bis-(isocyanatomethyl)-cyclohexane, m- and p-xylylene diisocyanate (m- and p-XDI), m- and p-tetramethyl-1,3- and -1,4-xylylene diisocyanate (m- and p-TMXDI), bis-(1-isocyanato-1-methyl-ethyl)-naphthalene, dimeric and trimeric fatty acid isocyanates, such as 3,6-bis-(9-isocyanatononyl)-4,5-di-(1-heptenyl)-cyclohexene (dimeryl diisocyanate), α,α,α,α',α", α"-hexamethyl-1,3,5-mesitylene triisocyanate, oligomers and polymers of the above-mentioned isocyanates, as well as any mixtures of the above-mentioned isocyanates. HDI and IPDI can be used.

Polyurethane polymers PUP with aromatic isocyanate groups can be used.

In an exemplary embodiment, a polyisocyanate PI in the form of a monomeric di- or triisocyanate or an oligomer of a monomeric diisocyanate or a derivative of a monomeric diisocyanate can be used as polyisocyanate P, whereby for example the above-mentioned aromatic and aliphatic di- and triisocyanates are suitable as monomeric di- or triisocyanate.

As polyisocyanate PI, the following can be used: oligomers or derivatives of monomeric diisocyanates, for example HDI, IPDI, TDI and MDI. Commercially available types are, for example, HDI biurets, for example as Desmodur® N 100 and N 3200 (from Bayer), Tolonate® HDB and HDB-LV (from Rhodia) and Duranate® 24A-100 (from Asahi Kasei); HDI isocyanurates, for example as Desmodur® N 3300, N 3600 and N 3790 BA (all from Bayer), Tolonate® HDT, HDT-LV, and HDT-LV2 (from Rhodia), Duranate® TPA-100 and THA-100 (from Asahi Kasei) and Coronate® HX (from Nippon Polyurethanes); HDI uretdiones, for example as Desmodur® N 3400 (from Bayer); HDI-iminooxadiazinediones, for example as Desmodur® XP 2410 (from Bayer); HDI-allophanates, for example as Desmodur® VP LS 2102 (from Bayer); IPDI isocyanurates, for example in solution as Desmodur® Z 4470 (from Bayer) or in solid form as Vestanat® T1890/100 (from Degussa); TDI oligomers, for example as Desmodur® IL (from Bayer); as well as mixed isocyanurates based on TDI/HDI, for example as Desmodur® HL (from Bayer). In addition, the following are especially suitable at room temperature: liquid forms of MDI (so-called "modified MDI"), which represent mixtures of MDI with MDI derivatives, such as, for example, MDI carbodiimides or MDI uretonimines or MDI urethanes, known, for example, under trade names such as Desmodur® CD, Desmodur® PF, Desmodur® PC (all from Bayer), as well as mixtures of MDI and MDI homologs (polymeric MDI or PMDI), available under trade names such as Desmodur® VL, Desmodur® VL50, Desmodur® VL R10, Desmodur® VL R20 and Desmodur® VKS 20F (all from Bayer), Isonate® M 309, Voranate® M 229, and Voranate® M 580 (all from Dow) or Lupranat® M 10 R (from BASF).

The above-mentioned oligomeric polyisocyanates PI in practice can represent mixtures of substances with different degrees of oligomerization and/or chemical structures. They can have a mean NCO functionality of 2.1 to 4.0 and contain for example, isocyanurate, iminooxadiazinedione, uretdione, urethane, biuret, allophanate, carbodiimide, uretonimine, or oxadiazinetrione groups. These oligomers can have a low content of monomeric diisocyanates.

As polyisocyanate PI, forms of MDI that are liquid at room temperature, as well as the oligomers of HDI, IPDI and TDI, for example, the isocyanurates and the biurets, can be used.

In an exemplary embodiment, the polyisocyanate P is a mixture that includes at least one polyurethane polymer PUP and at least one polyisocyanate PI, as they were described previously.

The polyisocyanate P can be a polyurethane polymer PUP that has aromatic isocyanate groups.

The polyisocyanate P can be present in an amount of 5 to 95% by weight, for example, in an amount of 10 to 90% by weight, relative to the entire composition. In filled compositions, i.e., compositions that contain a filler, the polyisocyanate P can be present in an amount of 5 to 60% by weight, for example, 10 to 50% by weight, relative to the entire composition.

The single-component, moisture-curing composition can comprise at least one aldimine A of Formula (I).

An exemplary aldimine A of Formula (I) is an aldimine A1 of Formula (I a) or (I b),

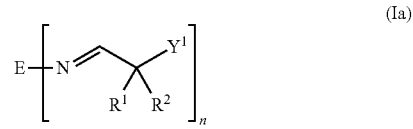

whereby
$R^1$ and $R^2$ either
independently of one another in each case stand for a monovalent hydrocarbon radical with 1 to 12 C atoms,
or together stand for a divalent hydrocarbon radical with 4 to 12 C atoms, which is part of an optionally substituted, carbocyclic ring with 5 to 8, for example 6, C atoms;
$Y^1$ stands for a monovalent hydrocarbon radical with 1 to 32 C atoms, which optionally has at least one heteroatom, for example, oxygen, in the form of ether, carbonyl or ester groups;
$Y^2$ either
stands for a substituted or unsubstituted aryl or heteroaryl radical, which has a ring size of 5 to 8, for example, 6 atoms, or for

whereby $R^6$ stands for a hydrogen atom or for an alkoxy radical, or for a substituted or unsubstituted alkenyl or arylalkenyl radical with at least 6 C atoms;
and E and n have the already mentioned meanings.
In each case, $R^1$ and $R^2$ can stand for a methyl radical.
$Y^1$ can stand for a radical of formula (II) or (III),

whereby
$R^3$ stands for a hydrogen atom or for an alkyl-, cycloalkyl-, arylalkyl radical or an alkoxycarbonyl radical with 1 to 12 C atoms;

R[4] stands for a hydrocarbon radical with 1 to 30 C atoms, which optionally contains ether oxygen atoms;

R[5] either stands for a hydrogen atom, or for a linear or branched alkyl radical with 1 to 30 C atoms, optionally with cyclic portions and optionally with at least one heteroatom, for example, oxygen, in the form of ether, carbonyl or ester groups, or for a linear or branched hydrocarbon radical with 5 to 30 C atoms that is unsaturated in one or more places, or for an optionally substituted, aromatic or heteroaromatic 5- or 6-membered ring.

Dotted lines in the formulas in this document in each case represent the bond between a substituent and the related molecule radical.

R[3] can stand for a hydrogen atom.

R[4] can stand for a hydrocarbon radical with 6 to 30, for example, with 11 to 30, C atoms, which optionally contains ether oxygen atoms.

R[5] can stand for a linear or branched alkyl radical with 6 to 30, for example, with 11 to 30, C atoms, optionally with cyclic portions and optionally with at least one heteroatom, or for a linear or branched hydrocarbon radical, unsaturated in one or more places, with 6 to 30, for example, with 11 to 30, C atoms.

R[5] can stand for a $C_{11}$-alkyl radical.

An exemplary aldimine A can be selected from aldimines A1 of Formula (I a), in which $Y^1$ stands for a radical of Formula (III).

An aldimine A of Formula (I) can be obtained by a condensation-reaction while being cleaved with water between at least one amine B of Formula (IV) and at least one aldehyde ALD of Formula (V). In this connection, the aldehyde ALD is used stoichiometrically or in stoichiometric excess relative to the amino groups of amine B.

$$E\!\!-\!\![NH_2]_n \quad (IV)$$

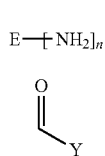
(V)

In Formulas (IV) and (V), E, n and Y have the already mentioned meanings.

As amine B, in an exemplary embodiment, polyamines with at least two primary aliphatic amino groups are suitable, such as, for example Aliphatic, cycloaliphatic or arylaliphatic diamines, for example ethylenediamine, 1,2-propanediamine, 1,3-propanediamine, 2-methyl-1,2-propanediamine, 2,2-dimethyl-1,3-propanediamine, 1,3-butanediamine, 1,4-butanediamine, 1,3-pentanediamine (DAMP), 1,5-pentanediamine, 1,5-diamino-2-methylpentane (MPMD), 2-butyl-2-ethyl-1,5-pentanediamine (C11-neodiamine), 1,6-hexanediamine, 2,5-dimethyl-1,6-hexanediamine, 2,2,4- and 2,4,4-trimethylhexamethylenediamine (TMD), 1,7-heptanediamine, 1,8-octanediamine, 1,9-nonanediamine, 1,10-decanediamine, 1,11-undecanediamine, 1,12-dodecanediamine, 1,2-, 1,3- and 1,4-diaminocyclohexane, bis-(4-aminocyclohexyl)-methane ($H_{12}$-MDA), bis-(4-amino-3-methylcyclohexyl)-methane, bis-(4-amino-3-ethylcyclohexyl)-methane, bis-(4-amino-3,5-dimethylcyclohexyl)-methane, bis-(4-amino-3-ethyl-5-methylcyclohexyl)-methane (M-MECA), 1-amino-3-aminomethyl-3,5,5-trimethylcyclohexane (=isophoronediamine or IPDA), 2- and 4-methyl-1,3-diaminocyclohexane and mixtures thereof, 1,3- and 1,4-bis-(aminomethyl)cyclohexane, 2,5(2,6)-bis-(aminomethyl)-bicyclo[2.2.1]heptane (NBDA), 3(4),8(9)-bis-(aminomethyl)-tricyclo-[5.2.1.0$^{2.6}$]decane, 1,4-diamino-2,2,6-trimethylcyclohexane (TMCDA), 1,8-menthane diamine, 3,9-bis-(3-aminopropyl)-2,4,8,10-tetraoxaspiro[5.5]undecane as well as 1,3- and 1,4-xylylenediamine;

Ether-group-containing aliphatic diamines, for example bis-(2-aminoethyl)ether, 3,6-dioxaoctane-1,8-diamine, 4,7-dioxadecane-1,10-diamine, 4,7-dioxadecane-2,9-diamine, 4,9-dioxadodecane-1,12-diamine, 5,8-dioxadodecane-3,10-diamine and higher oligomers of these diamines, bis-(3-aminopropyl)polytetrahydrofurans and other polytetrahydrofuran-diamines with molecular weights in the range of, for example, 350 to 5,200, as well as polyoxyalkylene-diamines. The latter typically represent products from the amination of polyoxyalkylene-diols and are available, for example, under the name Jeffamine® (from Huntsman), under the name polyether amine (from BASF) or under the name PC Amine® (from Nitroil). Especially suitable polyoxyalkylene-diamines are Jeffamine® D-230, Jeffamine® D-400, Jeffamine® D-2000, Jeffamine® D-4000, Jeffamine® XTJ-511, Jeffamine® ED-600, Jeffamine® ED-900, Jeffamine® ED-2003, Jeffamine® XTJ-568, Jeffamine® XTJ-569, Jeffamine® XTJ-523, Jeffamine® XTJ-536, Jeffamine® XTJ-542, Jeffamine® XTJ-559, Jeffamine® EDR-104, Jeffamine® EDR-148, Jeffamine® EDR-176; polyether amine D 230, polyether amine D 400 and polyether amine D 2000, PC Amine® DA 250, PC Amine® DA 400, PC Amine® DA 650 and PC Amine® DA 2000;

Aliphatic, cycloaliphatic or arylaliphatic triamines, such as 4-aminomethyl-1,8-octanediamine, 1,3,5-tris-(aminomethyl)-benzene, 1,3,5-tris-(aminomethyl)-cyclohexane, tris-(2-aminoethyl)-amine, tris-(2-aminopropyl)-amine, tris-(3-aminopropyl)-amine;

Polyoxyalkylene-triamines, which can represent products from the amination of polyoxyalkylene triols and are available, for example, under the trade name Jeffamine® (from Huntsman), under the name polyether amine (from BASF) or under the name PC Amine® (from Nitroil), such as, for example, Jeffamine® T-403, Jeffamine® T-3000, Jeffamine® T-5000; polyether amine T403, polyether amine T5000; and PC Amine® TA 403, PC Amine® TA 5000.

As amine B, in an exemplary embodiment, polyamines with at least two primary aromatic amino groups are suitable, for example, aromatic di- and triamines, such as, for example, 1,2-, 1,3- and 1,4-phenylenediamine, 2,4- and 2,6-toluylenediamine (TDA), 3,4-toluylenediamine, 3,5-dimethylthio-2,4- and -2,6-toluylenediamine, 3,5-diethyl-2,4- and -2,6-toluylenediamine (DETDA), 2,4,6-triethyl-1,3-phenylenediamine, 2,4,6-triisopropyl-1,3-phenylenediamine, 3-ethyl-5-methyl-2,4-toluylenediamine, 3,5-diisopropyl-2,4-toluylenediamine, 3,5-bis-(1-methylpropyl)-2,4-toluylenediamine, 3,5-bis-(tert-butyl)-2,4-toluylenediamine, 3-ethyl-5-isopropyl-2,4-toluylenediamine, 5-isopropyl-2,4-toluylenediamine, 5-(tert-butyl)-2,4-toluylenediamine, 4,6-bis-(1-methylpropyl)-1,3-phenylenediamine, 4-isopropyl-6-(tert-butyl)-1,3-phenylenediamine, 4-ethyl-6-isopropyl-1,3-phenylenediamine, 4-ethyl-6-(2-methylpropyl)-1,3- phenylenediamine, 4-ethyl-6-(1-methylpropyl)-1,3-phenylenediamine, 4-ethyl-6-(2-methylpropyl)-1,3-phenylenediamine, 4-isopropyl-6-(1-methylpropyl)-1,3-phenylenediamine, 4-(tert-butyl)-6-(2-methylpropyl)-1,3-phenylenediamine, 4-cyclopentyl-6-ethyl-1,3-phenylenediamine, 4-cyclopentyl-6-isopropyl-1,3-phenylenediamine, 4,6-dicyclopentyl-1,3-phenylenediamine, 3-isopropyl-2,6-toluylenediamine, 2-methylpropyl-(4-chloro-3,5-diaminobenzoate), tert-butyl-(4-chloro-3,5-diaminobenzoate), 2,6-diaminopyridine, melamine, 4,4'-, 2,4'- and 2,2'-diaminodiphenylmethane (MDA), 3,3'-dimethyl-4,4'-diaminodiphenylmethane, 3,3'-dichloro-4,4'-diaminodiphenylmethane (MOCA), 3,3',5,5'-tetraethyl-4,4'-diaminodiphenylmethane (M-DEA), 3,3',5,5'-tetraethyl-2,2'-dichloro-4,4'-diaminodiphenylmethane (M-CDEA), 3,3'-diisopropyl-5,5'-dimethyl-4,4'-diaminodiphenylmethane (M-MIPA), 3,3',5,5'-tetraisopropyl-4,4'-diaminodiphenylmethane (M-DTPA), 3,3',5,5'-tetra-(1-methylpropyl)-4,4'-diaminodiphenylmethane, 3,3'-dimethyl-5,5'-di-tert-butyl-4,4'-diaminodiphenylmethane, 3,3'-di-tert-butyl-4,4'-diaminodiphenylmethane, 4,4'-diaminodiphenylsulfone (DDS),4-amino-N-(4-aminophenyl)-benzenesulfonamide, 5,5'-methylenedianthranilic acid, dimethyl-(5,5'-methylenedianthranilate), 1,3-propylene-bis-(4-aminobenzoate), 1,4-butylene-bis-(4-aminobenzoate), polytetramethylene oxide-bis-(4-aminobenzoate) (available as Versalink® of Air Products) and 1,2-bis-(2-aminophenylthio)-ethane.

In an exemplary embodiment, the following are suitable as amine B: polyamines with primary aromatic and primary aliphatic amino groups, such as, for example, 4-(aminoethyl) aniline, 4-(aminomethyl)aniline, 4-[(4-aminocyclohexyl) methyl]aniline, 2-(aminoethyl)aniline, 2-(aminomethyl) aniline, 2-[(4-(aminocyclohexyl)methyl]aniline and 4-[(2-aminocyclohexyl)methyl]aniline.

An amine or an amino group in which the nitrogen atom is bonded exclusively to aliphatic, cycloaliphatic or arylaliphatic radicals is referred to as "aliphatic." An amine or an amino group in which the nitrogen atom is bonded directly to at least one aromatic or heteroaromatic radical is referred to as "aromatic."

Amine B can be selected from 1,6-hexamethylenediamine, MPMD, DAMP, IPDA, TMD, 1,3-xylylenediamine, 1,3-bis-(aminomethyl)cyclohexane, bis-(4-aminocyclohexyl)-methane, bis-(4-amino-3-methylcyclohexyl)-methane, 3(4),8(9)-bis-(aminomethyl)-tricyclo[5.2.1.0$^{2,6}$]decane, 1,2-, 1,3- and 1,4-diaminocyclohexane, 1,4-diamino-2,2,6-trimethylcyclohexane, 3,6-dioxaoctane-1,8-diamine, 4,7-dioxadecane-1, 10-diamine, 4-aminomethyl-1,8-octanediamine; polyoxyalkylene-polyamines with two or three amino groups, for example, the types D-230, D-400, D-2000, T-403 and T-5000 from Huntsman that are available under the trade name Jeffamine® and compounds from BASF or Nitroil that are analogous thereto; 1,3- and 1,4-phenylenediamine, 2,4- and 2,6-toluylenediamine, 4,4'-, 2,4'- and 2,2'-diaminodiphenylmethane, 3,3'-dichloro-4,4'-diaminodiphenylmethane; and mixtures of the above-mentioned polyamines.

The amine B can be selected from 1,6-hexamethylenediamine, MPMD, DAMP, IPDA, TMD and polyoxyalkylene-polyamines with two or three amino-groups, for example, the types D-230, D-400 and T-403 from Huntsman that can be obtained under the trade name Jeffamine® and compounds from BASF or Nitroil that are analogous thereto.

As aldehyde ALD, the following can be used: primary and secondary aliphatic aldehydes, for example, propanal, 2-methylpropanal, butanal, 2-methylbutanal, 2-ethylbutanal, pentanal, 2-methylpentanal, 3-methylpentanal, 4-methylpentanal, 2,3-dimethylpentanal, hexanal, 2-ethyl-hexanal, heptanal, octanal, nonanal, decanal, undecanal, 2-methyl-undecanal, dodecanal, methoxyacetaldehyde, cyclopropanecarboxaldehyde, cyclopentanecarboxaldehyde, cyclohexanecarboxaldehyde and diphenylacetaldehyde.

As aldehyde ALD, aldehydes that cannot enolize can be used, since said aldehydes form aldimino groups—which cannot tautomerize into enamino groups and therefore represent especially well blocked amino groups—in the reaction with primary amines. For example, tertiary aliphatic and aromatic aldehydes represent non-enolizable aldehydes.

As aldehyde ALD, tertiary aliphatic aldehydes ALD1 of Formula (V a),

(Va)

whereby $R^1$, $R^2$ and $Y^1$ have the already-mentioned meanings, can be used.

Suitable aldehydes ALD1 of Formula (V a) can include, for example, pivalaldehyde (=2,2-dimethyl-propanal), 2,2-dimethyl-butanal, 2,2-diethyl-butanal, 1-methyl-cyclopentanecarboxaldehyde, 1-methyl-cyclohexane-carboxaldehyde; ethers that include 2-hydroxy-2-methylpropanal and alcohols such as propanol, isopropanol, butanol and 2-ethylhexanol; esters that include 2-formyl-2-methylpropionic acid or 3-formyl-3-methylbutyric acid and alcohols such as propanol, isopropanol, butanol and 2-ethylhexanol; esters that include 2-hydroxy-2-methylpropanal and carboxylic acids such as butyric acid, isobutyric acid, and 2-ethylhexanoic acid; as well as the ethers and esters from 2,2-disubstituted 3-hydroxypropanals, -butanals or similar higher aldehydes, for example, 2,2-dimethyl-3-hydroxypropanal, that are described as suitable below.

Suitable aldehydes ALD1 of Formula (V a) can include in an exemplary embodiment of aldehyde ALD2 of Formula (V b),

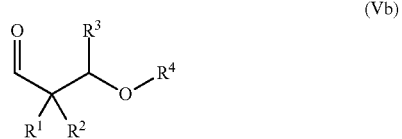

(Vb)

whereby $R^1$, $R^2$, $R^3$ and $R^4$ have the already mentioned meanings.

The aldehydes ALD2 of Formula (V b) can represent ethers of aliphatic, cycloaliphatic or arylaliphatic 2,2-disubstituted 3-hydroxyaldehydes with alcohols or phenols of the formula $R^4$—OH, for example fatty alcohols or phenols. Suitable 2,2-disubstituted 3-hydroxyaldehydes are in turn available from aldol reactions, for example, crossed aldol reactions, between primary or secondary aliphatic aldehydes, for example, formaldehyde, and secondary aliphatic, secondary cycloaliphatic or secondary arylaliphatic aldehydes, such as, for example, isobutyraldehyde, 2-methylbutyraldehyde, 2-ethylbutyraldehyde, 2-methylvaleraldehyde, 2-ethylcaproaldehyde, cyclopentanecarboxaldehyde, cyclohexanecarboxaldehyde, 1,2,3,6-tetrahydrobenzaldehyde, 2-methyl-3- phenylpropionaldehyde, 2-phenylpropionaldehyde (hydratropaldehyde) or diphenylacetaldehyde. Examples of suitable 2,2-disubstituted 3-hydroxyaldehydes are 2,2-dimethyl-3-hydroxypropanal, 2-hydroxymethyl-2-methyl-butanal, 2-hydroxymethyl-2-ethyl-butanal, 2-hydroxymethyl-2-methyl-pentanal, 2-hydroxymethyl-2-ethyl-hexanal, 1-hydroxymethyl-cyclopentanecarboxaldehyde, 1-hydroxymethyl-cyclohexanecarboxaldehyde, 1-hydroxymethyl-cyclohex-3-enecarboxaldehyde, 2-hydroxymethyl-2-methyl-3-phenyl-propanal, 3-hydroxy-2-methyl-2-phenyl-propanal and 3-hydroxy-2,2-diphenyl-propanal.

Especially suitable aldehydes ALD2 are 2,2-dimethyl-3-phenoxy-propanal, 3-cyclohexyloxy-2,2-dimethyl-propanal, 2,2-dimethyl-3-(2-ethyl-hexyloxy)-propanal, 2,2-dimethyl-3-lauroxy-propanal and 2,2-dimethyl-3-stearoxy-propanal.

Especially suitable aldehydes ALD1 of Formula (V a) are in another embodiment of aldehydes ALD3 of Formula (V c),

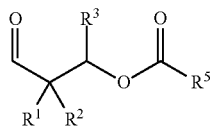

(Vc)

whereby $R^1$, $R^2$, $R^3$ and $R^5$ have the already mentioned meanings.

The aldehydes ALD3 of Formula (V c) represent esters of the already-described 2,2-disubstituted 3-hydroxyaldehydes, such as, for example, 2,2-dimethyl-3-hydroxypropanal, 2-hydroxymethyl-2-methyl-butanal, 2-hydroxymethyl-2-ethyl-butanal, 2-hydroxymethyl-2-methyl-pentanal, 2-hydroxymethyl-2-ethyl-hexanal, 1-hydroxymethyl-cyclopentanecarboxaldehyde, 1-hydroxymethyl-cyclohexanecarboxaldehyde, 1-hydroxymethyl-cyclohex-3-enecarboxaldehyde, 2-hydroxymethyl-2-methyl-3-phenyl-propanal, 3-hydroxy-2-methyl-2-phenyl-propanal and 3-hydroxy-2,2-diphenyl-propanal, with suitable carboxylic acids.

Carboxylic acids that are suitable for this reaction are, for example, saturated aliphatic carboxylic acids, such as formic acid, acetic acid, propionic acid, butyric acid, isobutyric acid, valeric acid, caproic acid, 2-ethyl-caproic acid, enanthic acid, caprylic acid, pelargonic acid, capric acid, undecanoic acid, lauric acid, tridecanoic acid, myristic acid, pentadecanoic acid, palmitic acid, margaric acid, stearic acid, nonadecanoic acid, arachidic acid; singly unsaturated aliphatic carboxylic acids such as palmitoleic acid, oleic acid, erucic acid; multiply unsaturated aliphatic carboxylic acids such as linoleic acid, linolenic acid, eleostearic acid, arachidonic acid; cycloaliphatic carboxylic acids such as cyclohexanecarboxylic acid; arylaliphatic carboxylic acids such as phenylacetic acid; aromatic carboxylic acids such as benzoic acid, naphthoic acid, toluoylic acid, anisic acid; isomers of these acids; fatty acid mixtures that include the technical saponification of natural oils and fats, such as, for example, rapeseed oil, sunflower oil, linseed oil, olive oil, coconut oil, palm kernel oil, and palm oil; as well as dicarboxylic acid monoalkyl- and -aryl esters, as they are obtained from the simple esterification of dicarboxylic acids such as succinic acid, glutaric acid, adipic acid, pimelic acid, suberic acid, azelaic acid, sebacic acid, 1,12-dodecanedioic acid, maleic acid, fumaric acid, hexahydrophthalic acid, hexahydroisophthalic acid, hexahydroterephthalic acid, 3,6,9-trioxaundecanedioic acid and similar derivatives of polyethylene glycol, with alcohols such as methanol, ethanol, propanol, butanol, higher homologs and isomers of these alcohols. Exemplary are carboxylic acids with at least 7 C atoms, for example, those with at least 12 C atoms.

As aldehyde ALD of Formula (V), aldehydes ALD4 of Formula (V d),

(Vd)

whereby $Y^2$ has the already mentioned meanings, can be suitable in an exemplary embodiment.

On the one hand, as aldehyde ALD4, the following can be used: aromatic aldehydes, such as, for example, benzaldehyde, 2- and 3- and 4-tolualdehyde, 4-ethyl- and 4-propyl- and 4-isopropyl and 4-butyl-benzaldehyde, 2,4-dimethylbenzaldehyde, 2,4,5-trimethylbenzaldehyde, 4-acetoxybenzaldehyde, 4-anisaldehyde, 4-ethoxybenzaldehyde, the isomeric di- and trialkoxybenzaldehydes, 2-, 3- and 4-nitrobenzaldehyde, 2- and 3- and 4-formylpyridine, 2-furfuraldehyde, 2-thiophenecarbaldehyde, 1- and 2-naphthylaldehyde, 3- and 4-phenyloxy-benzaldehyde, quinoline-2-carbaldehyde and its 3-, 4-, 5-, 6-, 7- and 8-positional isomers, as well as anthracene-9-carbaldehyde; as well as, in addition, glyoxal, glyoxalic acid ester, such as, for example, glyoxalic acid methyl ester, cinnamaldehyde, and substituted cinnamaldehydes.

As aldehyde ALD of Formula (V), the non-enolizable aldehydes ALD1 of Formula (V a), ALD2 of Formula (V b), ALD3 of Formula (V c) and ALD4 of Formula (V d) can be used. The aldehydes ALD2 of Formula (V b) and ALD3 of Formula (V c) can be used. The aldehydes ALD3 of Formula (V c), for example, those in which the radical $R^5$ has 6 to 30 C atoms, can be used. Odorless aldehydes ALD3 of Formula (V c), in which the radical $R^5$ has 11 to 30 C atoms, can be used. Of these, 2,2-dimethyl-3-lauroyloxy-propanal can be used.

The aldimine A of Formula (I) is present in the single-component, moisture-curing composition in such an amount that the ratio V1 between the number of aldimino groups and the number of isocyanate groups in the composition is in the range of 0.2 to 0.8, for example, 0.3 to 0.6.

Aldimines A1 of Formula (I a), which as $Y^1$ have a radical of Formula (III) with a radical $R^5$ with 6 to 30 C atoms, are low-odor and can be used.

Aldimines A1 of Formula (I a), which as $Y^1$ have a radical of Formula (III) with a radical $R^5$ with 11 to 30 C atom, are odor-free and can be used.

Compositions that contain such aldimines A1 of Formula (I a) have little or no odor before, during and after the curing.

A "low-odor" substance and a substance "with low odor production" can include, for example, a substance whose odor is perceptible to, i.e., can be smelled by, humans only to a slight extent; it thus does not have an intense odor like, for example, formaldehyde, acetaldehyde, isobutyraldehyde, or solvents such as acetone, methyl ethyl ketone or methyl isobutyl ketone, and whereby this slight odor is not considered to be unpleasant or repellent by most humans.

An "odor-free" substance is defined as a substance that cannot be smelled by most humans, and thus has no perceptible odor.

The single-component, moisture-curing composition can comprise at least one organomethoxysilane OS, which has at least one grouping of Formula (VI).

As organomethoxysilane OS, for example, the following can be used:

Methyltrimethoxysilane, propyltrimethoxysilane, 2-methylpropyltrimethoxysilane, 2,4,4-trimethylpentyltrimethoxysilane, octyltrimethoxysilane, hexadecyltrimethoxysilane, octadecyltrimethoxysilane, cyclohexyltrimethoxysilane, vinyltrimethoxysilane, phenyltrimethoxysilane, 3-glycidyloxypropyltrimethoxysilane, 2-(3,4-epoxycyclohexyl)-ethyltrimethoxysilane, 3-methacryloxypropyltrimethoxysilane, 3-acryloxypropyltrimethoxysilane, 3-isocyanatopropyltrimethoxysilane, N-trimethoxysilylpropyl-O-methyl-carbamate, S-octanoyl-mercaptopropyltrimethoxysilane; mercaptosilanes, for example, 3-mercaptopropyltrimethoxysilane; primary and secondary aminosilanes, for example, 3-aminopropyltrimethoxysilane, N-methyl-3-aminopropyl-trimethoxysilane, N-butyl-3-aminopropyltrimethoxysilane, N-phenyl-3-aminopropyltrimethoxysilane, N-cyclohexyl-3-aminopropyltrimethoxysilane, N-ethyl-3-aminoisobutyltrimethoxysilane, bis-(3-trimethoxysilylpropyl)amine, 3-mercaptopropyltrimethoxysilane, as well as the products that include the Michael-like addition of primary aminosilanes, such as, for example, 3-aminopropyltrimethoxysilane, with acrylonitrile, maleic- or fumaric acid diesters, citraconic acid diesters, acrylic- and methacrylic acid esters, acrylic- and methacrylic acid amides and itaconic acid diesters, reacted in the molar ratio 1:1; aldiminosilanes from the reaction of 3-aminopropyltrimethoxysilane with aldehydes, which cannot enolize, for example, with the already mentioned aldehydes ALD1 of Formula (V a), ALD2 of Formula (V b), ALD3 of Formula (V c) and ALD4 of Formula (V d); in addition, corresponding organomethoxysilanes, which have a dimethoxymethylsilane group instead of the trimethoxysilane group; in addition, adducts AD from mercaptosilanes or from primary or secondary aminosilanes with isocyanates or isothiocyanates; and in addition, oligomeric forms of the above-mentioned organomethoxysilanes.

Many of the above-mentioned organomethoxysilanes are commercially available, for example, from companies such as Wacker Chemie, Evonik Degussa, Momentive Performance Materials and Shin-Etsu.

As isocyanates or isothiocyanates for adducts AD, in an exemplary embodiment, monoisocyanates, or monoisothiocyanates, such as, for example, methyl isothiocyanate, ethyl isothiocyanate, butyl isocyanate, hexyl isocyanate, phenyl isocyanate, phenyl isothiocyanate, p-toluenesulfonyl-isocyanate and isocyanatopropyltrimethoxysilane can be used. In addition, suitable isocyanates for adducts AD are polyisocyanates such as for example the already mentioned polyisocyanates PI. In addition, suitable isocyanates for adducts AD are polyurethane polymers that have isocyanate groups, such as for example the already mentioned polyurethane polymers PUP. Adduction products that include polyurethane polymers that have isocyanate groups and amino- or mercaptosilanes can also be referred to as silane-functional polymers.

Other silane-functional polymers than those already mentioned can be used as organomethoxysilane OS. For example, silane-functional polymers with at least one grouping of formula (VI), which are available by a hydrosilylation reaction of polymers with terminal double bonds, for example poly(meth)acrylate polymers or polyether polymers, for example allyl-terminated polyoxyalkylene-polymers, are suitable. Also suitable are silane-functional polymers, which are available by the reaction of hydroxy-functional polymers with 3-isocyanatopropyl-trimethoxysilane or 3-isocyanatopropyl-dimethoxymethylsilane, whereby as hydroxyfunctional polymers, for example, polyether polyols are suitable, which optionally are chain-lengthened with polyisocyanates.

If a mercaptosilane or a primary or secondary aminosilane is used as an organomethoxysilane OS, an adduct AD with the existing polyisocyanate P can be thus formed in the composition in situ.

The organomethoxysilane OS can have at least one grouping of Formula (VI) with a=0.

The organomethoxysilane OS can be selected from 3-glycidoxypropyltrimethoxysilane, 2-(3,4-epoxycyclohexyl)-ethyltrimethoxysilane, 3-methacryloxypropyltrimethoxysilane, 3-isocyanatopropyltrimethoxysilane, vinyltrimethoxysilane, phenyltrimethoxysilane, 3-mercaptopropyltrimethoxysilane, bis-(3-trimethoxysilylpropyl)amine and N-(3-trimethoxysilyl-propyl)-amino-succinic acid-diethyl ester.

As organomethoxysilane OS, 3-glycidoxypropyltrimethoxysilane can be used.

The organomethoxysilane OS is present in the single-component, moisture-curing composition in such an amount that the ratio V2 between the number of methoxy groups of the organomethoxysilane OS and the number of isocyanate groups can be in the range of 0.2 to 0.7, for example, 0.2 to 0.5.

Upon contact with moisture, the silane groups of the organomethoxysilane OS can be hydrolyzed, whereby the methoxy groups can be cleaved off as methanol.

The single-component, moisture-curing composition can comprise at least one tin catalyst Z in the form of a dialkyltin (IV) compound. As a tin catalyst Z, for example, the following are suitable:

Dibutyl- and dioctyltin dicarboxylates such as dibutyltin dilaurate (DBTL), dioctyltin dilaurate (DOTL), dibutyltin diacetate (DBTA), dioctyltin diacetate (DOTA), dibutyltin-bis(2-ethylhexanoate), dioctyltin-bis(2-ethylhexanoate), dibutyltin dibutylate, dibutyltin-bis(neodecanoate), dibutyltin diversatate, dibutyltin-bis(methylmaleate), dibutyltin-bis(monobutylmaleate), dibutyltin-bis(octylmaleate), dibutyltin dioctanoate, dioctyltin dioctanoate, dibutyltin-bis(isooctanoate), dibutyltin dipalmitate, dibutyltin distearate, dibutyltin dioleate, dibutyltin dilinoleate, dibutyltin dilinolenate, dibutyltin maleate; dibutyl- and dioctyltin diketonates such as dibutyltin diacetylacetonate, dioctyltin diacetylacetonate; dibutyltin dichloride, dioctyltin dichloride, dibutyltin dibutoxide, dibutyltin oxide (DBTO), dioctyltin oxide; stannoxanes such as dibutyl-lauryldistannoxane and Sn,Sn'-bis(triethylorthosilicato-dibutyl)-distannoxane (Neostann™ U700 of Nitto Kasei); as well as corresponding dialkyltin (IV) compounds with other alkyl groups instead of butyl or octyl groups.

The tin catalyst Z can be selected from dibutyltin dichloride, dibutyltin dilaurate and dioctyltin dilaurate.

The tin catalyst Z can be present in the single-component, moisture-curing composition in such an amount that the ratio V3 between the number of tin atoms from the tin catalyst Z and the number of isocyanate groups is in a range of 0.002 to 0.006, for example, 0.002 to 0.0045.

The tin catalyst Z can accelerate the hydrolysis of the silane groups and the reaction of the isocyanate groups with, for example, water and methanol.

The single-component, moisture-curing composition can encompass at least one acid S.

The acid S can be, for example, any Brønsted acid, such as, for example, hydrochloric acid, sulfuric acid, sulfurous acid, amidosulfuric acid, phosphoric acid; mono- and dialkyl- and -arylphosphates such as tridecyl-phosphate, dibutyl phosphate, diphenyl phosphate and bis-(2-ethylhexyl)phosphate; phosphorous acid, nitric acid, nitrous acid, perchloric acid, chlorous acid, as well as any organic Brønsted acids, as well as mixtures of the above-mentioned Brønsted acids.

Exemplary as acid S are organic Brønsted acids, such as, for example,

Carboxylic acids, for example saturated, aliphatic monocarboxylic acids, such as formic acid, acetic acid, propionic acid, butyric acid, isobutyric acid, valeric acid, isovaleric acid, pivalic acid, caproic acid, enanthic acid, caprylic acid, 2-ethylhexanoic acid, pelargonic acid, capric acid, neodecanoic acid, undecanoic acid, lauric acid, tridecanoic acid, myristic acid, pentadecanoic acid, palmitic acid, margaric acid, stearic acid, isostearic acid, arachidic acid, behenic acid; saturated aliphatic polycarboxylic acids such as oxalic acid, malonic acid, succinic acid, glutaric acid, adipic acid, pimelic acid, suberic acid, azelaic acid, sebacic acid, dodecanedioic acid; singly or multiply unsaturated aliphatic mono- and polycarboxylic acids, such as palmitoleic acid, oleic acid, erucic acid, sorbic acid, linoleic acid, linolenic acid, eleostearic acid, ricinoleic acid, ricinic acid, maleic acid, fumaric acid, sorbic acid; cycloaliphatic mono- and polycarboxylic acids such as cyclohexanecarboxylic acid, hexahydrophthalic acid, tetrahydrophthalic acid, resin acids, naphthenic acids; aliphatic hydroxycarboxylic acids, such as glycolic acid, lactic acid, mandelic acid, hydroxybutyric acid, tartaric acid, malic acid, citric acid; halogenated aliphatic carboxylic acids such as trichloroacetic acid or 2-chloropropionic acid; aromatic mono- and polycarboxylic acids such as benzoic acid, salicylic acid, gallic acid, the positional-isomeric tolylic acids, methoxybenzoic acids, chlorobenzoic acids, nitrobenzoic acids, phthalic acid, terephthalic acid, isophthalic acid; technical carboxylic acid mixtures, such as, for example, versatic acids; polycarboxylic acids from the polymerization or copolymerization of acrylic and methacrylic acid;

Carboxylic acid anhydrides, such as phthalic acid anhydride, hexahydrophthalic acid anhydride and hexahydromethylphthalic acid-anhydride, silyl esters of organic carboxylic acids;

Silyl esters of organic carboxylic acids;

Sulfonic acids such as methylsulfonic acid, vinylsulfonic acid, butylsulfonic acid, 3-hydroxypropylsulfonic acid, sulfoacetic acid, benzenesulfonic acid, p-toluenesulfonic acid, p-xylenesulfonic acid, 4-dodecylbenzenesulfonic acid, 1-naphthalenesulfonic acid, dinonylnaphthalenesulfonic acid and dinonylnaphthalenedisulfonic acid, as well as sulfonic acid ester;

Organic phosphonic acids and mono alkyl phosphonates such as methylphosphonic acid, vinylphosphonic acid, butylphosphonic acid, 2-hydroxethylphosphonic acid, phenylphosphonic acid, toluoylphosphonic acid, xylylphosphonic acid, phosphonoacetic acid, etidronic acid, methylphosphonic acid ethyl ester; as well as mixtures of the above-mentioned Brønsted acids.

As acid S, organic Brønsted acids in the form of carboxylic acids and sulfonic acids, for example, aromatic carboxylic acids such as benzoic acid and salicylic acid, can be used. Salicylic acid can be used.

The acid S has a catalytic action on the hydrolysis of the aldimine A. As a result, depending on the concentration and acid strength, it produces a more or less strong acceleration of the reaction of the aldimine A with isocyanate groups if sufficient water is present in the composition.

For example, the acid S is present in the single-component, moisture-curing composition in an amount of 0.005 to 2% by weight, for example, 0.01 to 0.5% by weight.

The single-component, moisture-curing composition can optionally contain at least one additional component, for example, in adjuvants and additives that can be used in polyurethane compositions, for example the following:

Softeners, for example, carboxylic acid esters such as phthalates, for example, dioctyl phthalate, diisononyl phthalate, or diisodecyl phthalate, adipates, for example, dioctyl adipate, azelates and sebacates, organic phosphoric and sulfonic acid esters or polybutenes;

Non-reactive thermoplastic polymers, such as, for example, homo- or copolymers of unsaturated monomers, for example, from the group that comprises ethylene, propylene, butylene, isobutylene, isoprene, vinyl acetate, and alkyl(meth)acrylates, for example, polyethylene (PE), polypropylenes (PP), polyisobutylenes, ethylene vinyl acetate copolymers (EVA) and atactic poly-α-olefins (APAO);

Solvents;

Inorganic and organic fillers, for example ground or precipitated calcium carbonates, which optionally are coated with fatty acids, for example, stearates, barite ($BaSO_4$, also called barium sulfate), quartz flour, calcinated kaolins, aluminum oxides, aluminum hydroxides, silicic acids, for example, highly dispersed silicic acids from pyrolysis processes, carbon black, for example, industrially produced carbon black (referred to as "carbon black" below), PVC powder or hollow spheres;

Fibers, for example made of polyethylene;

Pigments, for example titanium dioxide or iron oxides;

Additional catalysts, which accelerate the reaction of the isocyanate groups, for example tin(II) compounds such as tin dioctoate and tin-bis(neodecanoate), bismuth compounds such as bismuth trioctoate and bismuth-tris (neodecanote), and compounds that contain tertiary amino groups, such as 2,2'-dimorpholinodiethyl ether and 1,4-diaza-bicyclo[2,2,2]octane;

Rheology modifiers, such as, for example, thickening agents or thixotropic agents, for example urea compounds, polyamide waxes, bentonites, or pyrogenic silicic acids;

Desiccants, such as, for example, molecular sieves, calcium oxide, highly-reactive isocyanates such as p-tosylisocyanate, orthoformic acid ester, silicic acid ester such as tetramethoxy- or -ethoxysilane;

Stabilizers to protect against heat, light and UV radiation;

Flame-retardant substances;

Surfactants such as, for example, wetting agents, flow enhancers, ventilating agents, or foam inhibitors;

Biocides, such as, for example, algicides, fungicides or substances that inhibit fungal growth;

as well as other substances that are usually used in single-component, moisture-curing polyurethane compositions.

When using such additional components, it can be advantageous to ensure that said components do not greatly impair the shelf life of the composition. This means that during storage of the composition under moisture-free conditions, said components do not trigger the cross-linking of the isocyanate groups to a significant extent. For example, this means that additives that are used in such a way can contain no water or at most only traces of water. It may be advisable to dry certain additives chemically or physically before mixing them into the composition.

The single-component, moisture-curing composition can be produced and stored under moisture-free conditions. It can have a long shelf life, i.e., it can be stored under moisture-free conditions in a suitable packaging or arrangement, such as, for example, a drum, a bag, or a cartridge over a period of several months up to one year and longer, without its being altered in its application properties or in its properties after curing to an extent that is relevant for its use. For example, the shelf life can be determined by measuring viscosity or extrusion force. Compositions that contain aromatic isocyanate groups can be especially stable in storage when an aldimine A1 of Formula (I a) or (I b), which cannot form any enamine, is present as aldimine A.

The aldimino groups of aldimine A can have the property of hydrolyzing upon contact with moisture. The isocyanate groups that are present in the composition can react with the amine B of Formula (IV) that is formally liberated during hydrolysis; in this connection, the corresponding aldehyde ALD of Formula (V) is released. In this case, the reaction of the isocyanate groups with the hydrolyzing aldimine A does not necessarily have to take place with the amine B. Of course, reactions with intermediate stages of the hydrolysis of the aldimine A are also possible. For example, it is conceivable that the hydrolyzing aldimine A in the form of a semi-aminal can react directly with the isocyanate groups.

The silane groups of the organomethoxysilane OS can have the property of hydrolyzing upon contact with moisture. In this case, with the release of methanol, Si—OH groups, so-called silanol groups, can be formed. The released methanol can react with existing isocyanate groups, whereby in each case, an O-methyl carbamate group is formed. If no isocyanate groups are available as reactants for liberated methanol, the latter can gradually diffuse out from the composition. The silanol groups that are produced in turn can condense from one another with release of water to form Si—O—Si groupings.

Existing isocyanate groups can react directly with moisture. For example, a urea group can be formed from two isocyanate groups while being cleaved with a $CO_2$ molecule.

The reaction of the hydrolyzing aldimine A with isocyanate groups and the reaction of isocyanate groups directly with moisture are so-called cross-linking reactions. As a result of these reactions, the composition ultimately cures; this process is also referred to as cross-linking.

The reaction of methanol with isocyanate groups is a so-called chain termination reaction. The O-methyl carbamate group that is formed in this case can no longer react with additional isocyanate groups. The isocyanate groups are thus "blocked." The O-methyl carbamate groups in the composition result in a loss of cross-linking sites and thus in a reduction of elasticity and mechanical strength of the cured composition, i.e., in rather plastic properties.

The moisture that can be required or desirable for curing can be derived either from the air (atmospheric humidity), or else the composition can be brought into contact with a water-containing component, for example by smearing, for example with a smoothing agent, or by spraying, or a water-containing component—for example in the form of an aqueous paste, which is mixed in, for example, with a static mixer—can be added to the composition in the application.

The composition can be cured by means of atmospheric humidity.

The single-component, moisture-curing composition that is described can be distinguished in that it can cure by means of moisture in such a way that the material that is produced in this case can have varying mechanical properties depending on the availability of moisture. Within the material, depending on the curing conditions, areas with varying deformation behavior from predominantly elastic to predominantly plastic, which gradually merge into one another, can be present. For example, the composition cures in such a way that the areas that are directly in contact with moisture—one layer facing the air or one side resting on a substrate that is moisture-permeable or that releases moisture—cure to form a material with predominantly elastic properties, while the areas that are in contact only indirectly, for example, via diffusion effects through adjacent areas—interior layers or layers that rest on substrates that are moisture-impermeable or that do not release any moisture—cure to form a material with more or fewer plastic properties, whereby the extent of plasticity of a material range increases with its increasing distance from the moisture source. Relative to the mechanical behavior, an anisotropic material can be produced from a material that is isotropic before curing by reaction with moisture from the outside to the inside.

For example, this curing behavior that results in anisotropic material properties is surprising. A possible explanation for this, but which is not to be limited to the disclosure, is the hypothesis that the methanol that is released from the hydrolysis of the organomethoxysilane OS can diffuse inward into material layers that are still not cured, instead of diffusing outward through the already cured material layers and evaporating from there; as a result, isocyanate groups inside the administered composition can react more strongly with methanol before they come into contact with hydrolyzing aldimino groups and/or moisture, and thus they result in a rather plastic material.

The occurrence of the described curing behavior can be used, by means of suitable control of the water supply, to produce a material that has—similar to a filled water hose—a predominantly elastic sheath and a predominantly plastic core.

For example, an anisotropic composition with a predominantly elastic sheath and a predominantly plastic core is obtained from the single-component, moisture-curing composition, previously described in detail, by curing by means of atmospheric humidity.

For the formation of the described anisotropic material properties, certain components of the composition can be present in proportions that are matched to one another, as they are defined by the ratios V1, V2 and V3.

Thus, the amount of aldimine A that is specified for the ratio V1 can be employed so that the formation of bubbles is suppressed and an elastic and resistant skin is formed. If less aldimine A than specified is used, there can be a danger of bubbles forming, and a thin skin is formed; if, however, more aldimine A than specified is used, a mechanically weak skin can be formed; in both cases, as a whole, the cured composition can have little resistance.

The amount of organomethoxysilane OS that is specified for the ratio V2 can be employed so that in the curing by means of atmospheric humidity, enough chain termination reactions take place in the interior to obtain a sufficiently large core with predominantly plastic properties. If less organomethoxysilane OS than specified is used, no further significant anisotropy occurs; if, conversely, more organomethoxysilane OS than specified is used, the proportion of the predominantly plastic manorial in the interior is very large, the elastic skin is thus very thin, and as a whole, the cured composition has little resistance.

The amount of tin catalyst Z that is specified for the ratio V3 in turn can be employed to accelerate the hydrolysis reaction of the organomethoxysilane OS and thus the release of methanol and subsequently the chain termination reaction in the interior of the material, in the correct measurement; if less tin catalyst Z than specified is used, for example, no further significant anisotropy occurs; conversely, if more tin catalyst Z than specified is used, for example, on the one hand, the proportion of the predominantly plastic material in the interior is very large, the elastic skin is thus very thin and as a whole, the cured composition has little resistance, and, on the other hand, the thermal stability of the cured composition is reduced.

The presence of an acid S in the described composition can be employed to accelerate the hydrolysis of the aldimine A and thus to make possible the formation of the elastic skin.

The extent of the described anisotropic material properties can depend on the layer thickness and the geometry of the applied composition. For example, it can be advantageous here if the composition is applied and cured in a sufficiently large layer thickness, typically of at least a few millimeters.

If the anisotropic material properties are not desired, the single-component, moisture-curing composition, however, can also be cured to form a largely or completely isotropic material, for example, by the composition being mixed essentially homogeneously in the application with a sufficient amount of water, for example by a water-containing paste being mixed into the composition by means of a static mixer. As a result, water is available in a sufficient amount in the entire composition, which results in that the composition cures to form an isotropic material with overall comparatively high strength and elasticity.

Thus, an isotropic composition is obtained from the single-component, moisture-curing composition that was previously described in detail by curing by means of, for example, essentially homogeneously mixed-in water or by means of a component that, for example, contains essentially homogeneously mixed-in water.

The mechanical properties of the composition thus can vary within a wide range not only by the selection and relative proportions of the components of the composition but also by the type of curing.

The single-component, moisture-curing composition can be suitable as an adhesive, sealant, sealing compound, or coating.

It can be suitable, for example, for applications in which flexible or damping properties can be required or desirable, for example flexible sealants for expansion joints on structures above or below ground level, vibration-suppressing seals or coatings on hardware or engines, or impact protection coatings, for example as undercarriage protection for motor vehicles.

The single-component, moisture-curing composition can be suitable as a flexible sealant for expansion joints on structures on diffusion-open bases, such as, for example, wood, concrete, mortar, brick, adobe, gypsum and natural stones, such as granite or marble, as well as porous plastics. Based on the anisotropic material properties, such joints have advantageous properties, such as, for example, a robust, non-tacky surface, a good shape recovery, and low values for the tensile stress at 23° C. and at −20° C.

It can be especially advantageous that 100% tensile stresses of 0.4 MPa at room temperature and ≦0.6 MPa at −20° C. can be achieved with a material with a non-tacky surface, such as can be required or desirable for a flexible joint sealant for the structural design of class 25LM according to EN ISO 11600.

In an exemplary embodiment, a method for bonding a substrate S1 to a substrate S2 is disclosed, which comprises:
α) application of the composition previously described in detail on a substrate S1;
β) bonding of the applied composition to a substrate S2 within the open time of the composition;
or
α') application of the composition previously described in detail on a substrate S1 and on a substrate S2;
β') bonding of the applied compositions to one another within the open time of the composition;
whereby the substrate S2 includes the same or a different material such as the substrate S1.

In this case, open time can be defined as the time within which no skin has formed on the surface of the applied composition. This can also be referred to as skin-formation time.

Another aspect of this disclosure can relate to a method for sealing. This can comprise:
α") application of the composition previously described in detail between a substrate S1 and a substrate S2, such that the composition is in contact with the substrate S1 and the substrate S2;
whereby the substrate S2 includes the same or a different material such as the substrate S1.

For example, the sealant is pressed into a so-called joint.

Another aspect of this disclosure can relate to a method for coating a substrate S1.

This can comprise:
α'") application of the composition previously described in detail on a substrate S1.

In this method, suitable substrates S1 and/or S2 can include, for example,
glass, glass ceramic, concrete, mortar, brick, adobe, gypsum and natural stones, such as granite or marble;
metals or alloys such as aluminum, steel, iron, non-ferrous metals, and galvanized metals;
leather, textiles, paper, wood, resin-bonded wood-based materials, resin-textile composites, and other so-called polymer composites;
plastics such as polyvinyl chloride (hard and soft PVC), acrylonitrile-butadiene-styrene copolymers (ABS), SMC (sheet molding compounds), polycarbonate (PC), polyamide (PA), polyester, poly(methylmethacrylate) (PMMA), polyester, epoxide resins, polyurethanes (PUR), polyoxymethylene (POM), polyolefins (PO), polyethylene (PE) or polypropylene (PP), ethylene/propylene copolymers (EPM) and ethylene/propylene/diene terpolymers (EPDM), whereby the plastics can be surface-treated, for example, by plasma, corona or flame;
coated substrates such as powder-coated metals or alloys; as well as paints and varnishes.

A method for sealing substrates S1 and/or S2 that are diffusion-open relative to moisture can be used. For example, these are substrates such as wood, concrete, mortar, brick, adobe, gypsum and natural stones such as granite or marble, as well as porous plastics.

If necessary, the substrates can be pretreated before the application of the composition. Such pretreatments can comprise, for example, physical and/or chemical cleaning methods, for example grinding, sandblasting, brushing, or the like, or treatment with cleaning agents or solvents, or the application of an adhesion promoter, an adhesion-promoting solution or a primer.

The application of the composition can be implemented in a wide temperature spectrum. For example, the composition is applied at room temperature. The composition can also, however, be applied at lower temperatures as well as at higher temperatures.

An article can be produced from this described method for gluing, sealing or coating—or from the use of the composition, previously described in detail, as an adhesive, sealant, sealing compound or coating.

This article can include a structure, for example, a structure that is above or below ground level, or an industrial item or a consumer item, for example, a window, a household appliance, or a means of transport, for example, a vehicle for water or land, for example, an automobile, a bus, a truck, a train or a boat, or an accessory of a means of transport, or an article of the furniture, textile or packaging industry.

The described composition can have a pasty consistency with structurally viscous properties. Such a pasty composition can be applied in use as an adhesive or sealant by means of a suitable device. Suitable methods for applying a pasty adhesive or sealant are, for example, the application of commercially available cartridges, which can be operated manually. An application by means of compressed air from a commercially available cartridge or from a vessel or pail by means of a feed pump or an extruder, optionally by means of an application robot, is also possible.

EXAMPLES

1. Description of the Measuring Methods

Viscosity was measured on a thermostated cone-plate-viscometer Physica UM (cone diameter 20 mm, cone angle 1°, cone tip-plate-interval 0.05 mm, shear rate 10 to 1,000 s$^{-1}$).

The amine content, i.e., the total content of aldimino groups and free amino groups in the compounds produced, was determined titrimetrically (with 0.1N HClO$_4$ in glacial acetic acid, against crystal violet), and is always indicated in mmol N/g.

2. Production of Aldimines

Aldimine A-1

55.0 g (0.19 mol) of distilled 2,2-dimethyl-3-lauroyloxy-propanal was introduced under nitrogen atmosphere into a round-bottom flask. While being stirred vigorously, 15.6 g (0.18 mol N) of 1-amino-3-aminomethyl-3-5,5-trimethylcyclohexane (=isophorone diamine, IPDA; Vestamin® IPD, Degussa, amine content 11.68 mmol N/g) was slowly added from an instillation funnel. Then, the volatile compounds were removed in a vacuum (10 mbar, 80° C.). Yield: 67.1 g of a clear, colorless oil with an amine content of 2.73 mmol N/g and a viscosity of 190 MPas at 20° C.

Aldimine A-2

52.4 g (0.18 mol) of distilled 2,2-dimethyl-3-lauroyloxy-propanal was introduced under nitrogen atmosphere into a round-bottom flask. While being stirred vigorously, 10.0 g (0.17 mol N) of 1,6-hexamethylenediamine (BASF; amine content 17.0 mmol N/g) was slowly added from a heated instillation funnel. Then, the volatile components were removed in a vacuum (10 mbar, 80° C.). Yield: 57.7 g of a clear, pale yellow oil with an amine content of 2.85 mmol N/g.

Aldimine A-3

74.3 g (0.26 mol) of distilled 2,2-dimethyl-3-lauroyloxy-propanal was introduced under nitrogen atmosphere into a round-bottom flask. While being stirred vigorously, 30.0 g (0.25 mol N) of polyether diamine (polyoxypropylene-diamine with a mean molecular weight of approximately 240 g/mol; Jeffamine® D-230, Huntsman; amine content 8.29 mmol N/g) was slowly added from an instillation funnel, whereby the mixture was heated and made increasingly cloudy. Then, the volatile components were removed in a vacuum (10 mbar, 80° C.). Yield: 99.5 g of a clear, pale-yellow oil with an amine content of 2.50 mmol N/g.

Aldimine A-4

25.0 g (0.21 mol N) of polyether diamine (polyoxypropylene-diamine with a mean molecular weight of approximately 240 g/mol; Jeffamine® D-230, Huntsman; amine content of 8.29 mmol N/g) was introduced under nitrogen atmosphere into a round-bottom flask. While being stirred vigorously, 23.0 g (0.22 mol) of benzaldehyde was slowly added from an instillation funnel, and the mixture was heated. Then, the volatile components were removed in a vacuum (10 mbar, 80° C.). Yield: 43.8 g of a clear, pale yellow oil with an amine content of 4.72 mmol N/g.

3. Production of Compositions

Examples 1 to 13 as well as Comparison Examples 14 to 20

Sealants

For each example, the respective components were processed to form a homogeneous paste according to Table 1 in the indicated parts by weight without preliminary drying in a vacuum mixer in a moisture-free environment, and said paste was decanted immediately into an aluminum cartridge that was varnished on the inside, and the cartridge was sealed in an airtight manner.

As TDI (toluoylene diisocyanate), Desmodur® T 80 P from Bayer was used.

The following silanes were used:

A187: 3-Glycidoxypropyltrimethoxysilane (Silquest® A-187, Momentive Performance Materials), XL10: Vinyl trimethoxysilane (Geniosil® XL 10, Wacker Chemie), VDM: Vinyl dimethoxymethylsilane (ABCR GmbH), Phen: Phenyltrimethoxysilane (ABCR GmbH), Asp: N-(3-Trimethoxysilylpropyl)-amino-succinic acid-diethyl ester (produced according to the maleic acid ester-aminosilane adduct that is described in WO 02/090411 A1 as Example 1), TMS: Tetramethoxysilane (=tetramethylorthosilicate) (ABCR GmbH), GLYEO: 3-Glycidoxypropyltriethoxysilane (Dynasylan® GLYEO, Evonik Degussa).

STP-1: Silane-functional polymer, which was produced as described below:

In a moisture-free environment, 1,000 g of polyoxypropylene diol (Acclaim® 12200, Bayer; OH Number 11.0 mg KOH/g), 43.6 g of isophorone diisocyanate (IPDI; Vestanat® IPDI, Degussa), 126.4 g of diisodecyl phthalate (DIDP; Palatinol® Z, BASF) and 0.12 g of dibutyltin dilaurate were heated to 90° C. while being stirred continuously and were left at this temperature until the titrimetrically determined content of free isocyanate groups had reached a value of 0.63% by weight. Then, 62.3 g of N-(3-trimethoxysilyl-propyl)-amino-succinic acid-diethyl ester (Asp) was mixed in, and the mixture was stirred at 90° C. until free isocyanate could no longer be detected by means of FT-IR spectroscopy. The silane-functional polymer was cooled to room temperature and stored with exclusion of moisture.

The polymer P-1 was produced as follows:

3,080 g of polyoxypropylene diol (Acclaim® 4200 N, Bayer; OH number 28.1 mg KOH/g), 1,540 g of polyoxypropylene polyoxyethylene-triol (Caradol® MD34-02, shell; OH number 35.0 mg KOH/g) and 385 g of toluoylene diisocyanate (TDI; Desmodur® T 80 P, Bayer) were reacted at 80° C. to form an NCO-terminated polyurethane polymer with a titrimetrically determined content of free isocyanate groups of 1.53% by weight.

The polymer P-2 was produced as follows:

590 g of polyoxypropylene diol (Acclaim® 4200 N, Bayer; OH number 28.1 mg KOH/g), 1,180 g of polyoxypropylene polyoxyethylene triol (Caradol® MD34-02, Shell; OH number 35.0 mg KOH/g) and 230 g of isophorone diisocyanate (IPDI; Vestanat® IPDI, Degussa) were reacted according to the known method at 80° C. to form an NCO-terminated polyurethane polymer with a titrimetrically specific content of free isocyanate groups of 2.10% by weight.

The thickening agent was produced as follows:

3,000 g of diisodecyl phthalate (DIDP; Palatinol® Z, BASF) and 480 g of 4,4'-methylene diphenyl diisocyanate (MDI; Desmodur® 44 MC L, Bayer) were introduced into a vacuum mixer and heated slightly. Then, 270 g of monobutylamine was slowly added in drops while being stirred vigorously. The paste that was produced was further stirred under vacuum and cooled for one hour.

measured. It was rated as "very good" (="s.gut" ["v. good"]) when the tip was in exactly the same or approximately unchanged position, and "good" when the tip was between the center and the base end. The tackiness was qualitatively determined by, for example, sealant being applied on the piece of cardboard that is fastened to the wall; the caulking gun was pulled away at the application end by quickly pulling back from the applied sealant, and the length of the thread remaining at the breakaway spot was measured in this case.

TABLE 1

Composition of the Sealants

| | Example | | | | | | | | | |
|---|---|---|---|---|---|---|---|---|---|---|
| | 1 | 2 | 3 | 4 | 5 | 6 | 7 | 8 | 9 | 10 |
| Polymer P-1 | 16.00 | 16.00 | 16.00 | 16.00 | 16.00 | 16.00 | 16.00 | 16.00 | 16.00 | 16.00 |
| Polymer P-2 | 8.00 | 8.00 | 8.00 | 8.00 | 8.00 | 8.00 | 8.00 | 8.00 | 8.00 | 8.00 |
| Dialdimine | A-1 | A-1 | A-2 | A-2/A-3 | A-4 | A-1 | A-1 | A-1 | A-1 | A-1 |
| | 1.59 | 1.59 | 3.03 | 1.52/1.73 | 1.83 | 2.11 | 2.11 | 3.18 | 3.18 | 2.11 |
| Diisodecyl Phtalate | 1.71 | 2.11 | 0.27 | 0.05 | 0.97 | 1.66 | 1.09 | 0.52 | 0.67 | 1.16 |
| Chalk | 38.00 | 38.00 | 38.00 | 38.00 | 38.00 | 38.00 | 38.00 | 38.00 | 38.00 | 38.00 |
| Thickening Agent | 28.00 | 28.00 | 28.00 | 28.00 | 28.00 | 28.00 | 28.00 | 28.00 | 28.00 | 28.00 |
| Titanium Dioxide | 4.50 | 4.50 | 4.50 | 4.50 | 4.50 | 4.50 | 4.50 | 4.50 | 4.50 | 4.50 |
| TDI | 0.40 | 0.40 | 0.40 | 0.40 | 0.40 | 0.40 | 0.40 | 0.40 | 0.40 | 0.40 |
| Organomethoxy-silane | A187 | A187 | A187 | A187 | A187 | A187 | A187 | A187 | XL10 | VDM |
| | 0.40 | 0.40 | 0.40 | 0.40 | 0.40 | 0.23 | 0.80 | 0.40 | 0.25 | 0.33 |
| Salicylic acid[a] | 0.60 | 0.60 | 0.60 | 0.60 | 1.50 | 0.60 | 0.60 | 0.60 | 0.60 | 0.60 |
| Dibutyltin dilaurate[a] | 0.80 | 0.40 | 0.80 | 0.80 | 0.40 | 0.40 | 0.40 | 0.40 | 0.40 | 0.80 |
| V1 Ratio [Aldimine/NCO] | 0.30 | 0.30 | 0.60 | 0.60 | 0.60 | 0.40 | 0.40 | 0.60 | 0.60 | 0.40 |
| V2 Ratio [Methoxy/NCO] | 0.35 | 0.35 | 0.35 | 0.35 | 0.35 | 0.20 | 0.70 | 0.35 | 0.35 | 0.35 |
| V3 Ratio [Tin/NCO] | 0.0044 | 0.0022 | 0.0044 | 0.0044 | 0.0022 | 0.0022 | 0.0022 | 0.0022 | 0.0022 | 0.0044 |

[a]5% by Weight in Dioctyl Adipate.

| | Example | | | | | | | | | |
|---|---|---|---|---|---|---|---|---|---|---|
| | 11 | 12 | 13 | 14 (Cf.) | 15 (Cf.) | 16 (Cf.) | 17 (Cf.) | 18 (Cf.) | 19 (Cf.) | 20 (Cf.) |
| Polymer P-1 | 16.00 | 16.00 | 16.00 | 16.00 | 16.00 | 16.00 | 16.00 | 16.00 | 16.00 | 16.00 |
| Polymer P-2 | 8.00 | 8.00 | — | 8.00 | 8.00 | 8.00 | 8.00 | 8.00 | 8.00 | 8.00 |
| Dialdimine | A-1 | A-1 | A-1 | A-1 | A-1 | A-1 | A-1 | A-1 | A-1 | — |
| | 2.11 | 2.11 | 1.52 | 1.59 | 1.59 | 2.11 | 2.11 | 1.59 | 3.18 | |
| Diisodecyl Phthalate | 1.66 | 1.40 | 2.16 | 2.26 | 2.41 | 1.49 | 1.70 | 2.51 | 0.52 | 3.70 |
| Chalk | 38.00 | 38.00 | 38.00 | 38.00 | 38.00 | 38.00 | 38.00 | 38.00 | 38.00 | 38.00 |
| Thickening Agent | 28.00 | 28.00 | 28.00 | 28.00 | 28.00 | 28.00 | 28.00 | 28.00 | 28.00 | 28.00 |
| Titanium Dioxide | 4.50 | 4.50 | 4.50 | 4.50 | 4.50 | 4.50 | 4.50 | 4.50 | 4.50 | 4.50 |
| TDI | 0.40 | 0.40 | 0.40 | 0.40 | 0.40 | 0.40 | 0.40 | 0.40 | 0.40 | 0.40 |
| Silane | Phen | Asp | STP-1 | A187 | A187 | A187 | TMS | — | GLYEO | A187 |
| | 0.33 | 0.59 | 8.42 | 0.40 | 0.40 | 0.40 | 0.19 | | 0.40 | 0.40 |
| Salicylic Acid[a] | 0.60 | 0.60 | 0.60 | 0.60 | 0.60 | 0.60 | 0.60 | 0.60 | 0.60 | 0.60 |
| Dibutyltin Dilaurate[a] | 0.40 | 0.40 | 0.40 | 0.25 | 0.10 | —[b] | 0.40 | 0.40 | 0.40 | 0.40 |
| V1 Ratio [Aldimine/NCO] | 0.40 | 0.40 | 0.40 | 0.30 | 0.30 | 0.40 | 0.40 | 0.30 | 0.60 | 0 |
| V2 Ratio [Methoxy/NCO] | 0.35 | 0.35 | 0.35 | 0.35 | 0.35 | 0.35 | 0.35 | 0 | 0 | 0.35 |
| V3 Ratio [Tin/NCO] | 0.0022 | 0.0022 | 0.0022 | 0.0014 | 0.0005 | 0 | 0.0022 | 0.0022 | 0.0022 | 0.0022 |

[a]5% by weight in dioctyl adipate.
[b]Instead of this, 0.50 GT of 2,2-dimorpholino diethyl ether was added The thus obtained sealants were tested regarding application properties, curing methods and properties after curing.

As measures of the application properties, stability and tackiness were used. To determine the stability, the sealant was applied by means of caulking guns via a triangular nozzle as horizontally-running triangular beads with a base diameter of 8 mm and a height (distance of the tip of the triangle to the base) of 20 mm to a perpendicular piece of cardboard. After 5 minutes, how far the tip had dropped, i.e., moved away, from the original position in the center of the triangular bead was To test the curing method, on the one hand, the skin formation time (time until freedom from adhesion, "tack-free time") was used. To this end, several grams of the room-temperature sealant was applied on cardboard in a layer thickness of approximately 2 mm, and in a normal climate (23±1° C. and 50±5% relative atmospheric humidity); the time that it took until no more residues were left on the pipette when the surface of the sealant was tilted slightly by means of a pipette made of LDPE was determined.

In addition, the sealant was qualitatively tested for adhesiveness by being pressed with the thumb after one day on the curing Shore A test piece (see below), and then it was determined how long the test piece could adhere to the thumb when the hand was raised. Adhesiveness was thereupon rated as high (test piece remains adhered for longer than 3 seconds), medium (test piece remains adhered for approximately 3 seconds), low (test piece remains adhered for 1 to 2 seconds), and zero (test piece remains adhered for less than 1 second). In addition, the sealant was evaluated visually for bubble formation during curing. Finally, the sealant was tested for anisotropy of the material properties. To this end, the room-temperature sealant was applied by means of a caulking gun through a round tip (10 mm opening) as a horizontal cone with a length of approximately 50 mm and a diameter on a base of 30 mm on a piece of cardboard fastened to the wall, left for 14 days under normal climatic conditions, then cut off at a distance of 1 cm from the base, and the cut surface was evaluated visually and by pressing a spatula on various points to determine whether the material in the outer layers was unlike that in the inner layers, by showing a gradual transition from an elastic to a plastic nature (anisotropy="yes") or whether the material was similar at all points (anisotropy="no"). With "(yes)," it is indicated that the material has only very slight anisotropic properties, i.e., only a very small plastic core is present. With the presence of anisotropic material properties, the thickness of the at least partially elastic skin ("skin thickness") was determined approximately with a scale. If the value "(15)" is indicated as the skin thickness, this means that the material has completely isotropic properties; the elastic "skin" thus continues through the entire cross-section of the cone and therefore formally has a thickness of 15 mm.

The Shore A hardness was determined according to DIN 53505 on test pieces cured for 14 days in a normal climate. The 100% tensile stress was determined in each case at 23° C. as well as at −20° C. according to DIN EN 28339 (with concrete test pieces, pretreated with Sika® primer-3N, Method A). The shape recovery was determined in a way similar to DIN EN 27389, whereby instead of aluminum profiles, concrete test pieces were used (pretreated with Sika® Primer-3N, method A, expansion by 100%). The adhesion and integrity of the joints after period expansion were examined according to DIN EN 28340 (Method A, concrete test pieces, pretreated with Sika® primer 3N, expansion by 100%).

The results of the tests are presented in Table 2.

It can be seen from Table 2 that the sealants of Examples 1 to 13 according to the disclosure cure without forming bubbles and have pronounced anisotropic material properties. In this case, they form a largely non-tacky surface and a sufficiently thick, elastic skin, so that they overcome the period expansion without damage (if this test were performed). In all of the Examples 1 to 13 (if this test were performed), the 100% tensile stress is ≦0.4 MPa at room temperature and ≦0.6 MPa at −20° C., as can be required or desirable for a flexible joint-sealant for the structural design of class 25LM according to EN ISO 11600. The sealants of the comparison examples are clearly distinguished therefrom: Comparison Examples 14 and 15 with less tin catalyst, Comparison Example 16 without a tin catalyst, and Comparison Examples 17, 18, and 19, which, instead of an organomethoxysilane OS, contain a silicic acid ester or an organoethoxysilane or even no silane, show no anisotropy or only slight anisotropy, and accordingly have a significantly higher 100% tensile stress. Comparison Example 20 without aldimine A shows strong anisotropic material properties, but forms only a very thin and strongly adhesive "skin" with insufficient stability and thus does not withstand the period expansion without damage.

Examples 21 to 25 and Comparison Examples 26 and 27

The sealants of Examples 1 and 9 and Comparison Examples 18 and 19 were cured at an accelerated pace by adding a water-containing component W. In this case, the respective sealant in the parts by weight indicated in Table 3 was essentially mixed homogenously with the component W. The mixing was carried out by means of a two-component gun with a mounted static mixer of the Sulzer Quadro® type (available from Sulzer Chemtech) with 24 mixing elements. With the mixed sealant, a Shore A test piece was produced as described in DIN 53505; it was allowed to cure during one day in a normal climate and then tested for Shore A Hardness at room temperature. The results of the tests are presented in Table 3.

TABLE 2

Properties of Sealants.

| | Example | | | | | | | | | |
|---|---|---|---|---|---|---|---|---|---|---|
| | 1 | 2 | 3 | 4 | 5 | 6 | 7 | 8 | 9 | 10 |
| Stability | Very Good | Very Good | Very Good | Very Good | Very Good | Very Good | Very Good | Very Good | Very Good | Very Good |
| Tackiness (cm) | 5 | 3 | 2 | 3 | 6 | 3 | 3 | 3 | 3 | 3 |
| Skin Formation Time (min) | 95 | 135 | 30 | 32 | 75 | 90 | 90 | 85 | 95 | 80 |
| Adhesiveness | None | None | None | None | Low | None | None | None | None | None |
| Bubble Formation | None | None | None | None | None | None | None | None | None | None |
| Anisotropy | Yes | Yes | Yes | Yes | Yes | Yes | Yes | Yes | Yes | Yes |
| Skin Thickness (mm) | 4 | 7 | 7 | 6 | 5 | 6 | 3 | 7 | 6 | 8 |
| Shore A Hardness at 23° C. | 26 | 33 | 35 | 28 | 33 | 30 | 29 | 31 | 32 | 30 |
| Shore A Hardness at −20° C. | 33 | 45 | 47 | 44 | 39 | 45 | 47 | 44 | 42 | 45 |
| 100% Tensile Stress at 23° C. (MPa) | 0.2 | 0.3 | 0.3 | 0.2 | 0.3 | n.d. | n.d. | 0.3 | 0.3 | n.d. |
| 100% Tensile Stress at −20° C. (MPa) | 0.4 | 0.6 | 0.6 | 0.4 | 0.6 | n.d. | n.d. | 0.5 | 0.5 | n.d. |
| Shape Recovery (%) at 23° C./at −20° C. | 72/86 | 82/94 | 75/91 | 75/91 | 83/91 | n.d. | n.d. | 72/91 | 70/88 | n.d. |
| Adhesion and Integrity of the Joints after Period Expansion | kV | kV | kV | kV | kV | n.d. | n.d. | kV | kV | n.d. | n.d. = Not Determined
kV = No Failure

TABLE 2-continued

Properties of Sealants.

| | Example | | | | | | | | | |
|---|---|---|---|---|---|---|---|---|---|---|
| | 11 | 12 | 13 | 14 (Cf.) | 15 (Cf.) | 16 (Cf.) | 17 (Cf.) | 18 (Cf.) | 19 (Cf.) | 20 (Cf.) |
| Stability | Very Good | Very Good | Very Good | Very Good | Very Good | Very Good | Very Good | Very Good | Good | Good |
| Tackiness (cm) | 3 | 3 | 3 | 3 | 3 | 4 | 3 | 3 | 3 | 8 |
| Skin Formation Time (min) | 90 | 85 | 75 | 165 | 245 | 90 | 90 | 130 | 95 | 360 |
| Adhesiveness | None | None | Low | None | None | None | None | None | None | High |
| Bubble Formation | None | None | None | None | None | None | None | None | None | Some |
| Anisotropy | Yes | Yes | Yes | (Yes) | No | No | (Yes) | No | No | Yes |
| Skin Thickness (mm) | 5 | 6 | 6 | 12 | (15) | (15) | 12 | (15) | (15) | 2 |
| Shore A Hardness at 23° C. | 31 | 30 | 25 | 36 | 37 | 42 | 34 | 43 | 42 | 22 |
| Shore A Hardness at −20° C. | 41 | 43 | 36 | 46 | 45 | 48 | 47 | 50 | 52 | 36 |
| 100% Tensile Stress at 23° C. (MPa) | n.d. | n.d. | n.d. | 0.5 | 0.6 | n.d. | n.d. | 0.9 | 0.7 | 0.2 |
| 100% Tensile Stress at −20° C. (MPa) | n.d. | n.d. | n.d. | 0.9 | 1.0 | n.d. | n.d. | 1.4 | 1.1 | 0.4 |
| Shape Recovery (%) at 23° C./at −20° C. | n.d. | n.d. | n.d. | 82/91 | 81/91 | n.d. | n.d. | n.m. | n.m. | 64/83 |
| Adhesion and Integrity of the Joints after Period Expansion | n.d. | n.d. | n.d. | kV | kV | n.d. | n.d. | kV | kV | V | n.d. = Not Determined
kV = No Failure
n.m. = Non-measurable (Concrete Break)
V = Failure: Torn on the Corners The water-containing component W was produced as follows:

In a vacuum mixture, isophorone diisocyanate (IPDI; Vestanat® IPDI, Degussa) with a polyether polyol (Caradol® ED56-11, Shell), aminoethylethanolamine, and 2,2-bis-(hydroxymethyl)-propionic acid in N-methylpyrrolidone (NMP) were reacted according to known methods to form a polyadduct, which was neutralized with trimethylamine and diluted with water until a water content of 29.5% by weight was reached; in this case, an emulsion containing a polyurethane polymer that has ion groups with a mean molecular weight of approximately 20,000 was obtained. 85 g of this emulsion was mixed in a vacuum mixer with 10 g of hydrophilic pyrogenic silicic acid (Aerosil® 200, Degussa) and 5 g of chalk (Omya® 5 GU, Omya) to form a fine-creamy paste with a water content of 25% by weight.

TABLE 3

Sealants that Cure at an Accelerated Pace.

| | Example | | | | | | |
|---|---|---|---|---|---|---|---|
| | 21 | 22 | 23 | 24 | 25 | 26 (Cf.) | 27 (Cf.) |
| Sealant from Example | 1 | 1 | 1 | 1 | 9 | 18 | 19 |
| | 99.0 | 98.5 | 98.0 | 97.0 | 97.0 | 97.0 | 97.0 |
| Component W | 1.0 | 1.5 | 2.0 | 3.0 | 3.0 | 3.0 | 3.0 |
| [Water/NCO] | 1.0 | 1.5 | 2.0 | 3.0 | 3.0 | 3.0 | 3.0 |
| Shore A Hardness at 23° C. | 24 | 33 | 38 | 41 | 40 | 44 | 42 |

It can be seen from the Shore A Hardnesses of Examples 21 to 25 that Examples 1 and 9 according to the disclosure can be cured at an accelerated pace by adding water, whereby with a smaller amount of water, the curing results in a softer material, and with a larger amount of water, the curing results in a harder material. With a water/NCO ratio of 3.0, the Shore A Hardness of the sealants of Example 1 (Example 24) or Example 9 (Example 25) virtually achieved the value of the isotropic, silane-free sealant of Comparison Example 18. In comparison thereto, the Shore A Hardness of the sealant of Comparison Example 18 (Comparison Example 26) or 19 (Comparison Example 27) by the admixing of water reached approximately the same values as in the curing with atmospheric humidity.

It will be appreciated by those skilled in the art that the present invention can be embodied in other specific forms without departing from the spirit or characteristics thereof. The presently disclosed embodiments are therefore considered in all respects to be illustrative and not restricted.

What is claimed is:

1. A single-component, moisture-curing composition, comprising:
    a) at least one polyurethane polymer PUP formed from a reaction of at least one aromatic or aliphatic polyisocyanate and at least one polyol, wherein a content of free isocyanate groups of the polyurethane polymer PUP is 0.5 to 15% by weight;
    b) at least one aldimine A formed from a condensation reaction between at least one polyamine B with at least two primary aliphatic amino groups, and at least one aldehyde selected from the group consisting of an aldehyde ALD2 of formula (V b), an aldehyde ALD3 of Formula (V c) and an aromatic aldehyde:

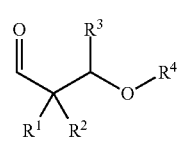

(V b)

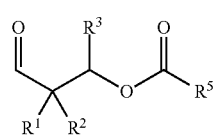

(V c)

wherein
$R^1$ and $R^2$ either
independently of one another in each case stands for a monovalent hydrocarbon radical with 1 to 12 C atoms,
or together stand for a divalent hydrocarbon radical with 4 to 12 C atoms, which is part of an optionally substituted, carbocyclic ring with 5 to 8 C atoms;
$R^3$ stands for a hydrogen atom or for an alkyl-, cycloalkyl-, arylalkyl radical or an alkoxycarbonyl radical with 1 to 12 C atoms;
$R^4$ stands for a hydrocarbon radical with 1 to 30 C atoms, which optionally contains ether oxygen atoms;
$R^5$ stands for
a hydrogen atom, or
a linear or branched alkyl radical with 1 to 30 C atoms, optionally with cyclic proportions and optionally with at least one heteroatom, or
a singly or multiply unsaturated, linear or branched hydrocarbon radical with 5 to 30 C atoms, or
an optionally substituted, aromatic or heteroaromatic 5- or 6-membered ring;
c) at least one organomethoxysilane OS selected from the group consisting of an organotrimethoxysilane, an organodimethoxymethylsilane and a combination thereof
d) at least one tin catalyst Z in the form of a dialkyltin(IV) compound,
e) at least one organic Brønsted acid S; provided that in the composition,
(i) a ratio V1 between a number of aldimino groups and a number of isocyanate groups is in a range of 0.2 to 0.8,
(ii) a ratio V2 between a number of methoxy groups of the organomethoxysilane OS and a number of isocyanate groups is in a range of 0.2 to 0.7, and
(iii) a ratio V3 between a number of tin atoms from the tin catalyst Z and a number of isocyanate groups is in a range of 0.002 to 0.006.

2. The single-component, moisture-curing composition according to claim 1, wherein $R^1$ and $R^2$ each stands for a methyl group.

3. The single-component, moisture-curing composition according to claim 1, wherein $R^4$ stands for a hydrocarbon radical with 6 to 30 C atoms, which optionally contains ether oxygen atoms.

4. The single-component, moisture-curing composition according to claim 1, wherein
$R^5$ either stands for a linear or branched alkyl radical with 6 to 30 C atoms, optionally with cyclic proportions and optionally with at least one heteroatom,
or
stands for a linear or branched hydrocarbon radical, unsaturated in one or more places, with 6 to 30 C atoms.

5. The single-component, moisture-curing composition according to claim 1, wherein the polyamine B is selected from the group consisting of 1,6-hexamethylenediamine, 1,5-diamino-2-methylpentane (MPMD), 1,3-pentanediamine (DAMP), 1-amino-3-aminomethyl-3,5,5-trimethylcyclohexane (=isophoronediamine or IPDA), 2,2,4- and 2,4,4-trimethylhexamethylenediamine (TMD), 1,3-xylylenediamine, 1,3-bis-(aminomethyl)cyclohexane, bis-(4-aminocyclohexyl)-methane, bis-(4-amino-3-methylcyclohexyl)-methane, 3(4),8(9)-bis-(aminomethyl)-tricyclo[5.2.1.0$^{2.6}$]decane, 1,2-, 1,3- and 1,4-diaminocyclohexane, 1,4-diamino-2,2,6-trimethylcyclohexane, 3,6-dioxaoctane-1,8-diamine, 4,7-dioxadecane-1,10-diamine, 4-aminomethyl-1,8-octanediamine; polyoxyalkylene-polyamines with two or three amino groups, 1,3- and 1,4-phenylenediamine, 2,4- and 2,6-toluylenediamine, 4,4'-, 2,4'- and 2,2'-diaminodiphenylmethane, 3,3'-dichloro-4,4'-diaminodiphenylmethane; and mixtures of the above-mentioned polyamines.

6. The single-component, moisture-curing composition according to claim 1, wherein the organomethoxysilane OS is the organotrimethoxysilane, and wherein the organotrimethoxysilane is selected from the group consisting of 3-glycidoxypropyltrimethoxysilane, 2-(3,4-epoxycyclohexyl)-ethyltrimethoxysilane, 3-methacryloxypropyltrimethoxysilane, 3-isocyanatopropyltrimethoxysilane, vinyltrimethoxysilane, phenyltrimethoxysilane, 3-mercaptopropyltrimethoxysilane, bis-(3-trimethoxysilylpropyl)amine and N-(3-trimethoxysilylpropyl)-amino-succinic acid-diethyl ester.

7. The single-component, moisture-curing composition according to claim 1, wherein the polyurethane polymer PUP has aromatic isocyanate groups.

8. The single-component, moisture-curing composition according to claim 1, wherein the tin catalyst Z is selected from the group consisting of dibutyltin dichloride, dibutyltin dilaurate and dioctyltin dilaurate.

9. A method for bonding a substrate S1 to a substrate S2, comprising:
α) applying the single-component, moisture-curing composition according to claim 1 on a substrate S1; and
β) bonding of the applied composition to a substrate S2 within an open time of the composition;
or
α') applying the single-component, moisture-curing composition according to claim 1 on a substrate S1 and on a substrate S2; and
β') bonding of the applied composition on the substrate S1 and on the substrate S2 to one another within an open time of the composition;
wherein the substrate S2 is formed of the same or a different material as the substrate S1.

10. A method for sealing, comprising:
α") applying the single-component, moisture-curing composition according to claim 1 between a substrate S1 and a substrate S2, such that the composition is in contact with the substrate S1 and the substrate S2;
wherein the substrate S2 is formed of the same or a different material as the substrate S1.

11. An anisotropic composition with a predominantly elastic sheath and a predominantly plastic core, produced by curing the single-component, moisture-curing composition according to claim 1 by atmospheric humidity.

12. An isotropic composition that is produced by curing the single-component, moisture-curing composition according to claim 1 by essentially homogeneously mixed-in water or by a component that contains essentially homogeneously mixed-in water.

13. The single-component, moisture-curing composition according to claim 1, wherein $R^1$ and $R^2$ together stand for a divalent hydrocarbon radical with 4 to 12 C atoms, which is part of an optionally substituted, carbocyclic ring with 6 C atoms.

14. The single-component, moisture-curing composition according to claim 1, wherein $R^5$ stands for a linear or branched alkyl radical with 1 to 30 C atoms, optionally with cyclic portions, and with at least one oxygen in the form of an ether, carbonyl or ester group.

15. The single-component, moisture-curing composition according to claim 3, wherein $R^4$ stands for a hydrocarbon radical with 11 to 30 C atoms, which optionally contains ether oxygen atoms.

16. The single-component, moisture-curing composition according to claim 4, wherein $R^5$ stands for a linear or branched alkyl radical with 11 to 30 C atoms, optionally with cyclic proportions and optionally with at least one heteroatom.

17. The single-component, moisture-curing composition according to claim 4, wherein $R^5$ stands for a linear or branched hydrocarbon radical, unsaturated in one or more places, with 11 to 30 C atoms.

18. The single-component, moisture-curing composition according to claim 17, wherein $R^5$ stands for a $C_{11}$-alkyl radical.

19. The single-component, moisture-curing composition according to claim 1, wherein the organomethoxysilane OS comprises 3-glycidoxypropyltrimethoxysilane, the tin catalyst Z comprises dibutyltin dilaurate, and the acid S comprises salicylic acid.

20. The method according to claim 9, wherein the organomethoxysilane OS comprises 3-glycidoxypropyltrimethoxysilane, the tin catalyst Z comprises dibutyltin dilaurate, and the acid S comprises salicylic acid.

21. The method according to claim 10, wherein the organomethoxysilane OS comprises 3-g lycidoxypropyltrimethoxysilane, the tin catalyst Z comprises dibutyltin dilaurate, and the acid S comprises salicylic acid.

22. The single-component, moisture-curing composition according to claim 1, wherein the organomethoxysilane OS is the organodimethoxymethylsilane, and wherein the organodimethoxymethylsilane is a vinyl dimethoxymethylsilane.

23. The single-component, moisture-curing composition according to claim 1, wherein the organomethoxysilane OS is the organotrimethoxysilane, and wherein the organotrimethoxysilane is selected from the group consisting of 3-glycidoxypropyltrimethoxysilane, vinyltrimethoxysilane, phenyltrimethoxysilane, N-(3-trimethoxysilylpropyl)-aminosuccinic acid-diethyl ester and a combination thereof.

* * * * *